United States Patent
Kang

(10) Patent No.: US 12,449,531 B2
(45) Date of Patent: Oct. 21, 2025

(54) APPARATUS AND METHOD FOR MONITORING SURROUNDING ENVIRONMENT OF VEHICLE

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 403 days.

(21) Appl. No.: 17/870,356

(22) Filed: Jul. 21, 2022

(65) Prior Publication Data

US 2023/0024713 A1    Jan. 26, 2023

(30) Foreign Application Priority Data

Jul. 21, 2021  (KR) .................. 10-2021-0095583
Jul. 21, 2021  (KR) .................. 10-2021-0095584
Jul. 21, 2021  (KR) .................. 10-2021-0095585

(51) Int. Cl.
  *G01S 13/89*   (2006.01)
  *G01S 13/931*  (2020.01)

(52) U.S. Cl.
  CPC ........... *G01S 13/89* (2013.01); *G01S 13/931* (2013.01); *G01S 2013/9315* (2020.01)

(58) Field of Classification Search
  None
  See application file for complete search history.

(56) References Cited

U.S. PATENT DOCUMENTS

2019/0346854 A1* 11/2019 Slutsky ................ G01S 13/878
2020/0103523 A1*  4/2020 Liu ...................... G01S 13/87
2020/0365029 A1  11/2020 Kourous-Harrigan et al.
2021/0179182 A1   6/2021 Kim
2022/0089183 A1*  3/2022 Hwu ................. B60W 60/0011

FOREIGN PATENT DOCUMENTS

CN       113093221 A  *  7/2021 ............ G01C 21/32
KR    10-2021-0077367 A    6/2021

OTHER PUBLICATIONS

Schauer, Johannes et al., "Removing Non-Static Objects from 3D Laser Scan Data," ISPRS Journal of Photogrammetry and Remote Sensing, Jun. 2018, (24 Pages in English).
Extended European Search Report Issued on Mar. 17, 2023, in Counterpart European Patent Application No. 22184250.3 (16 Pages in English).

* cited by examiner

*Primary Examiner* — Vladimir Magloire
(74) *Attorney, Agent, or Firm* — NSIP Law

(57) ABSTRACT

An apparatus for monitoring the surrounding environment of a vehicle may include a sensor unit including a plurality of detection sensors configured to detect an object outside the vehicle according to frames with a time period; and a controller configured to extract a stationary object among outside objects detected through the sensor unit based on behavior information of the vehicle, map the extracted stationary object to a grid map, add occupancy information to each of grids constituting the grid map, in response to the stationary object being mapped to the grid map, calculate an occupancy probability parameter indicating the probability that the stationary object will be located at each of the grids, from the occupancy information added to the grids within the grid map in a plurality of frames, and monitor the surrounding environment of the vehicle on the basis of the occupancy probability parameter.

12 Claims, 41 Drawing Sheets

$K^{th}$ Frame $K^{th}$ Frame

FIG. 14

Before update error correction

After update error correction $$EdgeFlag(i,j) = \begin{matrix} 1, if(\sum_{k=i-1}^{i+1}\sum_{r=j-1}^{j+1} D_{map}(k,r) < 9) \\ 0, else \end{matrix}$$

APPARATUS AND METHOD FOR MONITORING SURROUNDING ENVIRONMENT OF VEHICLE

CROSS-REFERENCE TO RELATED APPLICATION

This application claims the benefit under 35 USC § 119(a) of Korean Patent Application Nos. 10-2021-0095583, 10-2021-0095584, and 10-2021-0095585, filed on Jul. 21, 2021, the entire disclosure of which are incorporated herein by reference for all purposes.

BACKGROUND

Field

Exemplary embodiments of the present disclosure relate to an apparatus and method for monitoring the surrounding environment of a vehicle, and more particularly, to an apparatus and method for monitoring the surrounding environment of a vehicle by using an OGM (Occupancy Grid Map).

Description of Related Art

A radar for a vehicle refers to a device that detects an outside object within a detection area when the vehicle travels, and warns a driver to help the driver to safely drive the vehicle. FIGS. 1A and 1B illustrate areas to which general radars for a vehicle transmit radar signals to detect an outside object. The radar for a vehicle operates to transmit a radar signal according to a frame with a predefined period, and detect an outside object. As illustrated in FIG. 1B, the signal characteristics of the transmitted radar signal, such as a waveform, frequency, distance resolution, angle resolution, maximum sensing distance, and FoV (Field of View), are different depending on a system of the vehicle, to which the radar is applied. Examples of the system include a DAS (Driver Assistance System) such as BSD (Blind Spot Detection), LCA (Lane Change Assistance), or RCTA (Rear Cross Traffic Alert).

The related art of the present disclosure is disclosed in Korean Patent Application Laid-Open No. 10-2013-0130843 published on Dec. 2, 2013.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for monitoring a surrounding environment of a vehicle, including a sensor unit comprising a plurality of detection sensors for detecting objects outside a vehicle according to a frame at a time period, and a controller configured to extract a stationary object from among the objects detected by the sensor unit based on behavior information of the vehicle, map the stationary object to a grid map, add occupancy information to each of grids constituting the grid map, in response to the mapping being performed, calculate an occupancy probability parameter, indicative of a probability that the stationary object is located on each grid, from the occupancy information added to the grid in the grid map in a plurality of frames to be monitored, monitor the surrounding environment of the vehicle based on the occupancy probability parameter, and correct a shaded grid, corresponding to a shaded area where the sensor unit is not able to detect an object outside the vehicle, in a differential manner according to the speed of the vehicle.

The controller may be configured to correct a shaded grid, corresponding to a shaded area where the sensor unit is not able to detect the object outside the vehicle in a $K^{th}$ frame, in a first scheme to receive an occupancy probability parameter in a $(K-1)^{th}$ frame, in response to the speed of the vehicle being equal to or higher than a threshold.

The controller may be configured to correct a shaded grid, corresponding to a shaded area where the sensor unit is not able to detect the object outside the vehicle in a $K^{th}$ frame, in a second scheme to receive an occupancy probability parameter of a grid around the shaded grid, in response to the speed of the vehicle being less than a threshold.

The controller may be configured to correct a shaded grid from an outermost shaded grid in the second scheme, and to set the highest occupancy probability parameter, from among the occupancy probability parameters of grids located within a set range from the shaded grid, as an occupation probability parameter of the shaded grid from the outermost shaded grid in the second scheme.

In another general aspect, there is provided an apparatus for monitoring a surrounding environment of a vehicle, including a sensor unit comprising a plurality of detection sensors for detecting an objects outside a vehicle according to a frame at a time period, and a controller configured to extract a stationary object from among the objects detected by the sensor unit, map the extracted stationary object to a grid map, calculate an occupancy probability parameter, indicative of a probability that the stationary object is located on a grid of the grid map, from a result of mapping, and monitor the surrounding environment of the vehicle by specifying a grid on which the stationary object is located in the grid map, based on the calculated occupancy probability parameter and recognizing a free space around the vehicle using the specified grid.

The controller may be configured to determine a peak grid with a maximum occupancy probability parameter among the grids in the grid map, and to determine that the stationary object is located on the peak grid, in response to the occupancy probability parameter of the peak grid being equal to or greater than a threshold value defined for the peak grid, and the peak grid on which the stationary object is determined to be located comprises a plurality of peak grids in relation to the driving of the vehicle.

The controller may be configured to map a stationary object corresponding to the peak grid to an azimuth map, the azimuth map having a plurality of azimuth indexes partitioned at equal radial intervals by a set radius and a set angle and sharing coordinates with the grid map, and to recognize an azimuth index, to which no stationary object is mapped, as the free space around the vehicle.

The controller may be configured to correct a third azimuth index to which a stationary object is not mapped to an azimuth index to which a stationary object is mapped when a correction condition is satisfied, in response to the third azimuth index existing adjacent to first and second azimuth indexes to which first and second stationary objects are mapped, respectively, and a third stationary object existing in an area in which the third azimuth index expands radially.

In response to the distances from the vehicle to the first to third stationary objects being defined as first to third distances, respectively, the correction condition may include any one or any combination of i) a condition in which the difference between the first and second distances is less than a reference value, ii) a condition in which the third azimuth index is located between the first and second azimuth indexes, iii) a condition in which the difference between the first and third distances is greater than a reference value and the difference between the second and third distances is greater than a reference value, and iv) a condition in which the third distance is greater than the first and second distances.

The azimuth indexes on the azimuth map may have index flags having sequential values set according to the sequential positions of the respective azimuth indexes, and the controller may be configured to correct the third azimuth index by incorporating the third stationary object into the third azimuth index using longitudinal and transverse coordinates of the first stationary object, longitudinal and transverse coordinates of the second stationary object, and first and second index flags of the respective first and second azimuth indexes.

The controller may be configured to corrects the third azimuth index using Equation below $$Xpos(\text{target3}) = \Delta Xpos\_\text{unit} \times (\text{index3} - \text{index1}) + Xpos(\text{target1})$$

$$Ypos(\text{target3}) = \Delta Xpos\_\text{unit} \times (\text{index3} - \text{index1}) + Ypos(\text{target1})$$

where $$\Delta Xpos\_\text{unit} = \frac{Xpos_{(\text{target2})} - Xpos_{(\text{target1})}}{\text{index2} - \text{index1}}$$

$$\Delta Ypos\_\text{unit} = \frac{Ypos_{(\text{target2})} - Ypos_{(\text{target1})}}{\text{index2} - \text{index1}}$$

where Xpos(target3) and Ypos(target3) may be longitudinal and transverse coordinates at a position where the third stationary object is incorporated into the third azimuth index, Xpos(target1) and Ypos(target1) may be the longitudinal and transverse coordinates of the first stationary object, Xpos(target2) and Ypos(target2) may be the longitudinal and transverse coordinates of the second stationary object, and index1 to index3 may be the index flags of the respective first to third azimuth indexes.

In another general aspect, there is provided an apparatus for monitoring a surrounding environment of a vehicle, including a sensor unit comprising a plurality of detection sensors for detecting an object outside a vehicle according to a frame at a time period, and a controller configured to extract a stationary object from among the objects detected by the sensor unit, map the extracted stationary object to a grid map, calculate an occupancy probability parameter, indicative of a probability that the stationary object is located on a grid of the grid map, from the result of mapping, monitor the surrounding environment of the vehicle by specifying a grid on which the stationary object is located in the grid map, based on the calculated occupancy probability parameter, apply a clustering algorithm to the specified grid to create one or more clusters composed of a plurality of grids having the same characteristic, and to extract an edge grid of each of the created one or more clusters to monitor a continuous structure around the vehicle.

The controller may be configured to determine a peak grid with a maximum occupancy probability parameter among the plurality of grids in the grid map, and to determine that the stationary object is located on the peak grid, in response to the occupancy probability parameter of the peak grid being equal to or greater than a threshold value defined for the peak grid, and the peak grid on which the stationary object is determined to be located comprises a plurality of peak grids in relation to the driving of the vehicle.

The controller may be configured to use a density based spatial clustering of applications with noise (DBSCAN) algorithm as the clustering algorithm to create one or more clusters.

The clustering criterion of the DBSCAN algorithm may correspond to a distance between the peak grids where the stationary object is determined to be located.

The controller may be configured to extract grids in which a peak grid does not exist in an immediately adjacent grid, as edge grid of the cluster, from among the grids constituting the cluster.

The controller may be configured to determine nearest edge grids, which are at positions closest to the vehicle, among the extracted edge grids, and to determine the nearest edge grids as grids on which continuous structures around the vehicle are located, in response to the determined nearest edge grids being continuously arranged.

The grid map may have a longitudinal axis, a transverse axis, and an index set with respect to the vehicle, and when the nearest edge grids of the cluster may be determined, the controller may be configured to determine the nearest edge grids of the cluster in a variable manner depending on a quadrant in which that cluster exists from among first to fourth quadrants partitioned in the grid map with respect to the vehicle.

The controller may be configured to determine, as a nearest edge grid, a grid with minimum longitudinal and minimum transverse coordinates of an index among the edge grids of the cluster, in response to the cluster existing in the first quadrant, determine, as a nearest edge grid, a grid with maximum longitudinal and minimum transverse coordinates of an index among the edge grids of the cluster, in response to the cluster existing in the second quadrant, determine, as a nearest edge grid, a grid with maximum longitudinal and maximum transverse coordinates of an index among the edge grids of the cluster, in response to the cluster existing in the third quadrant, and determine, as a nearest edge grid, a grid with minimum longitudinal and maximum transverse coordinates of an index among the edge grids of the cluster, in response to the cluster existing in the fourth quadrant.

BRIEF DESCRIPTION OF THE DRAWINGS

Figure 14:
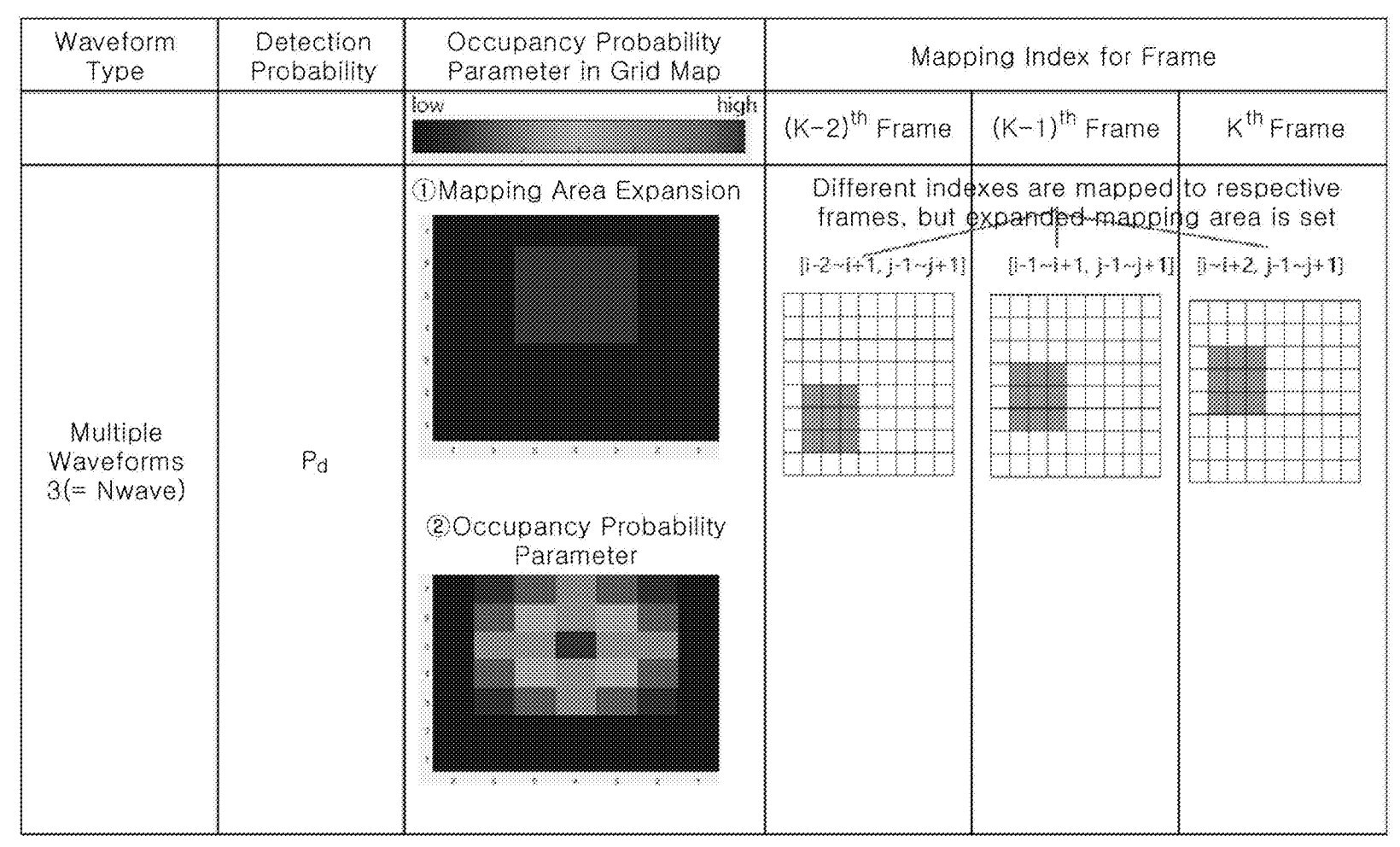

FIGS. 12 to 14 are diagrams illustrating a process of deciding an expanded mapping area in the apparatus for monitoring the surrounding environment of a vehicle in accordance with the embodiment of the present disclosure.

Figure 1A:
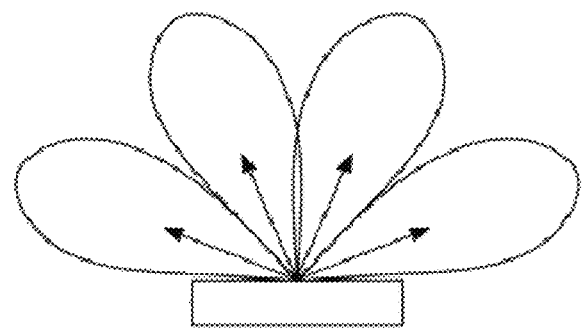
FIGS. 1A and 1B are diagrams illustrating areas to which general radars for a vehicle transmit radar signals to detect an outside object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Figure 2:
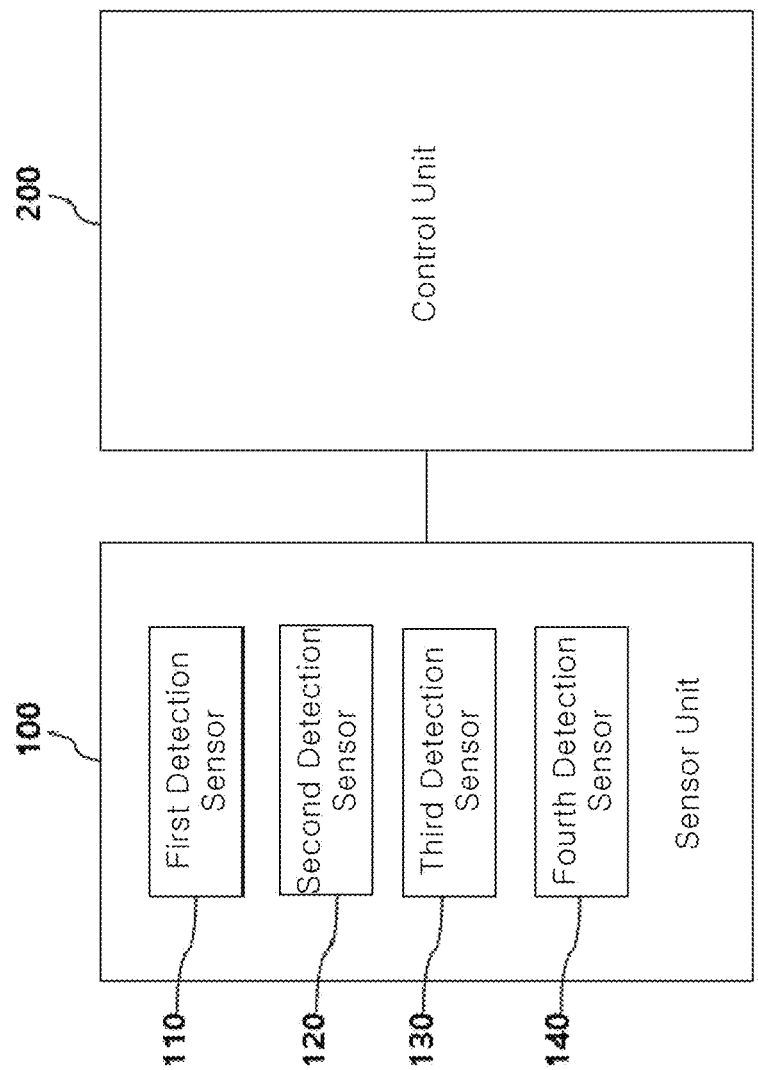
FIG. 2 is a block configuration diagram for describing an apparatus for monitoring the surrounding environment of a vehicle in accordance with an embodiment of the present disclosure.
Figure 2:
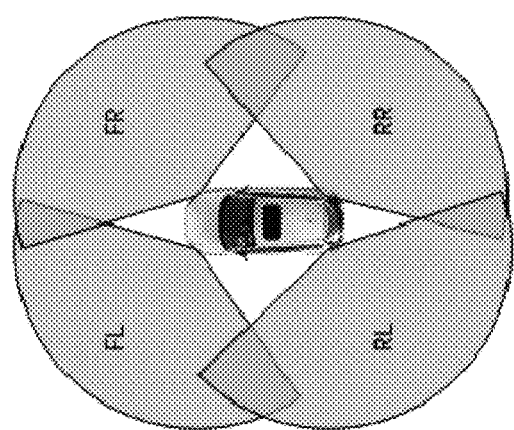
Figure 3:
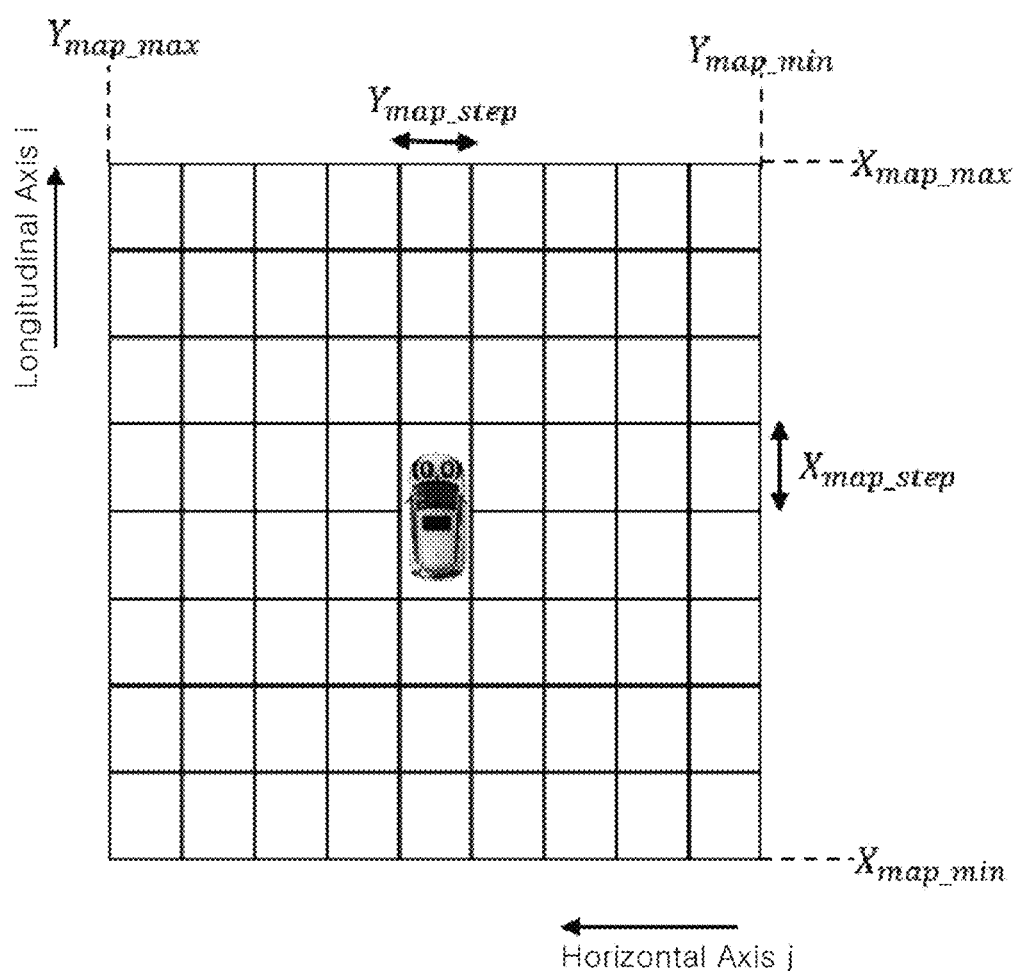
FIG. 3 is a diagram illustrating a grid map in the apparatus for monitoring the surrounding environment of a vehicle in accordance with the embodiment of the present disclosure.
Figure 9A:
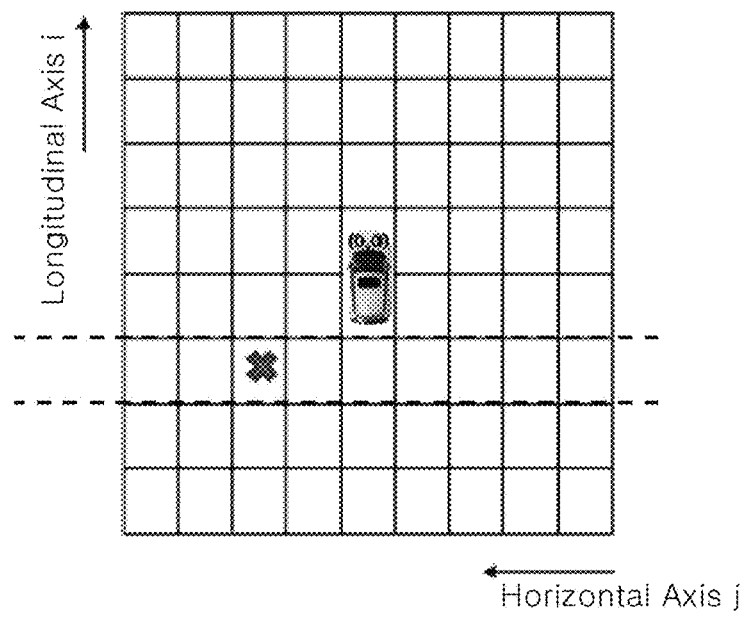
FIGS. 9 and 10 are diagrams illustrating a process of updating the grid map in the apparatus for monitoring the surrounding environment of a vehicle in accordance with the embodiment of the present disclosure.
Figure 9B:
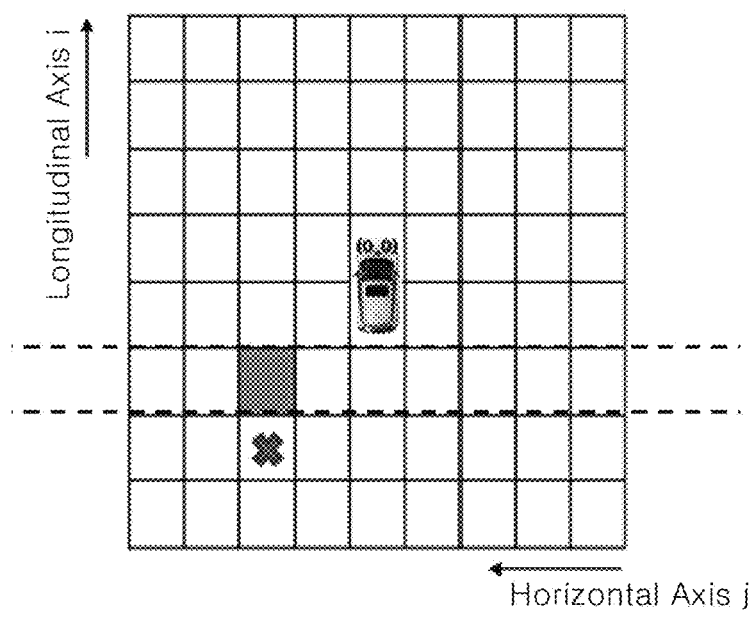
Figure 9C:
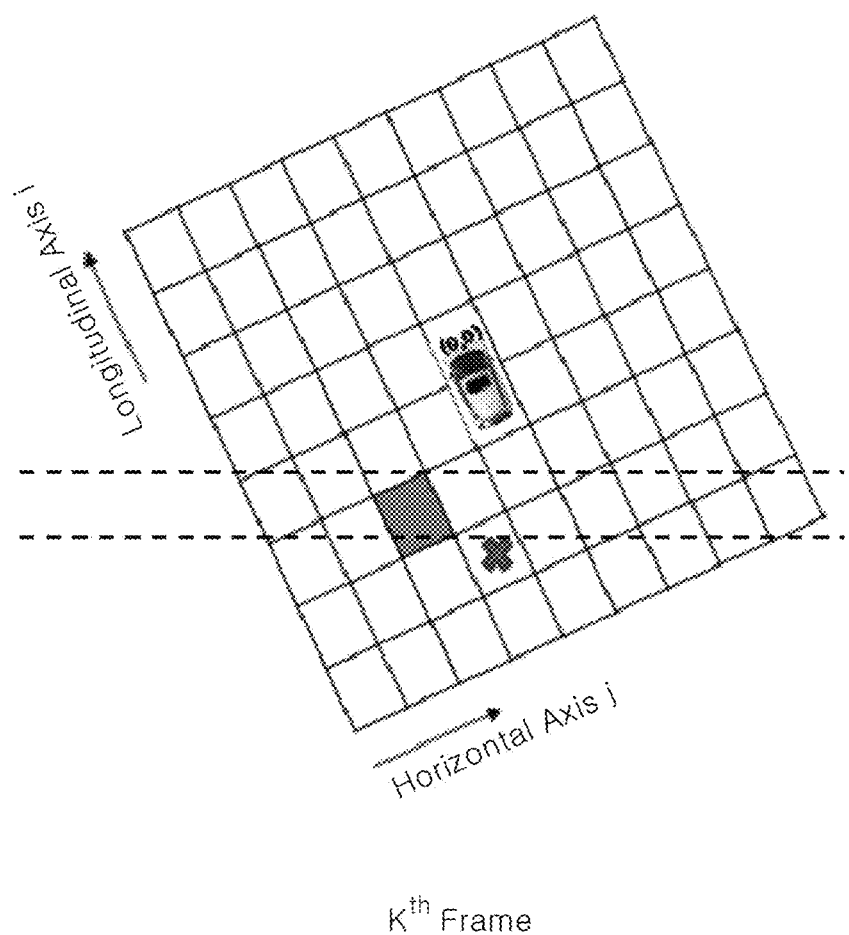
Figure 10:
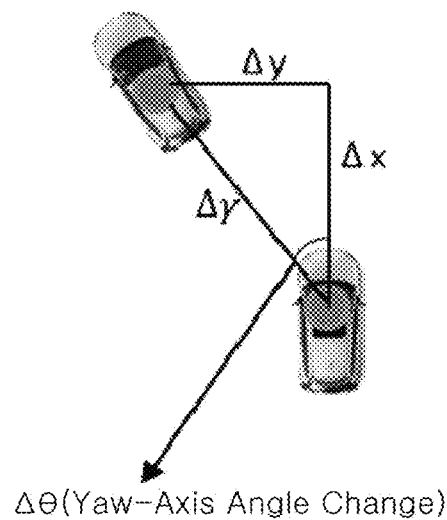
Figure 11:
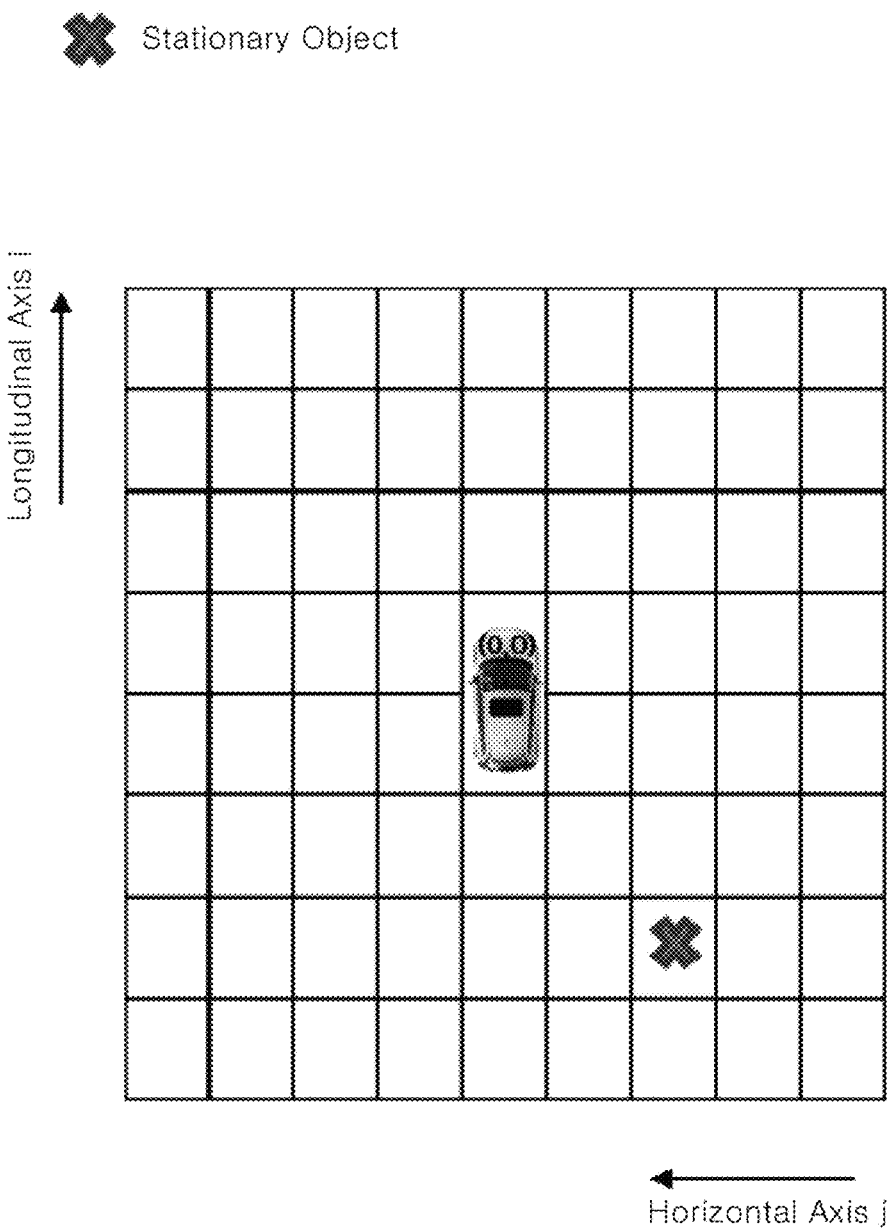
FIG. 11 is a diagram illustrating a process of mapping a stationary object to the grid map in the apparatus for monitoring the surrounding environment of a vehicle in accordance with the embodiment of the present disclosure.
Figure 12:
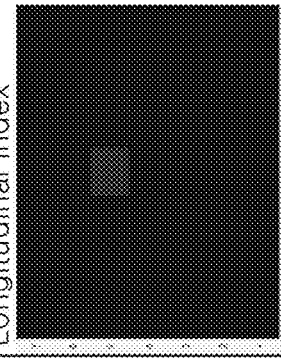
Figure 13:
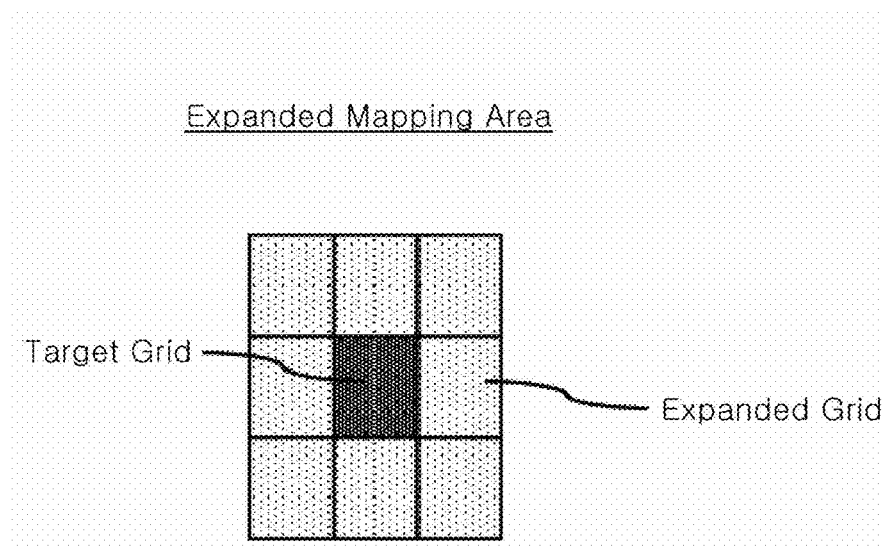
Figure 15:
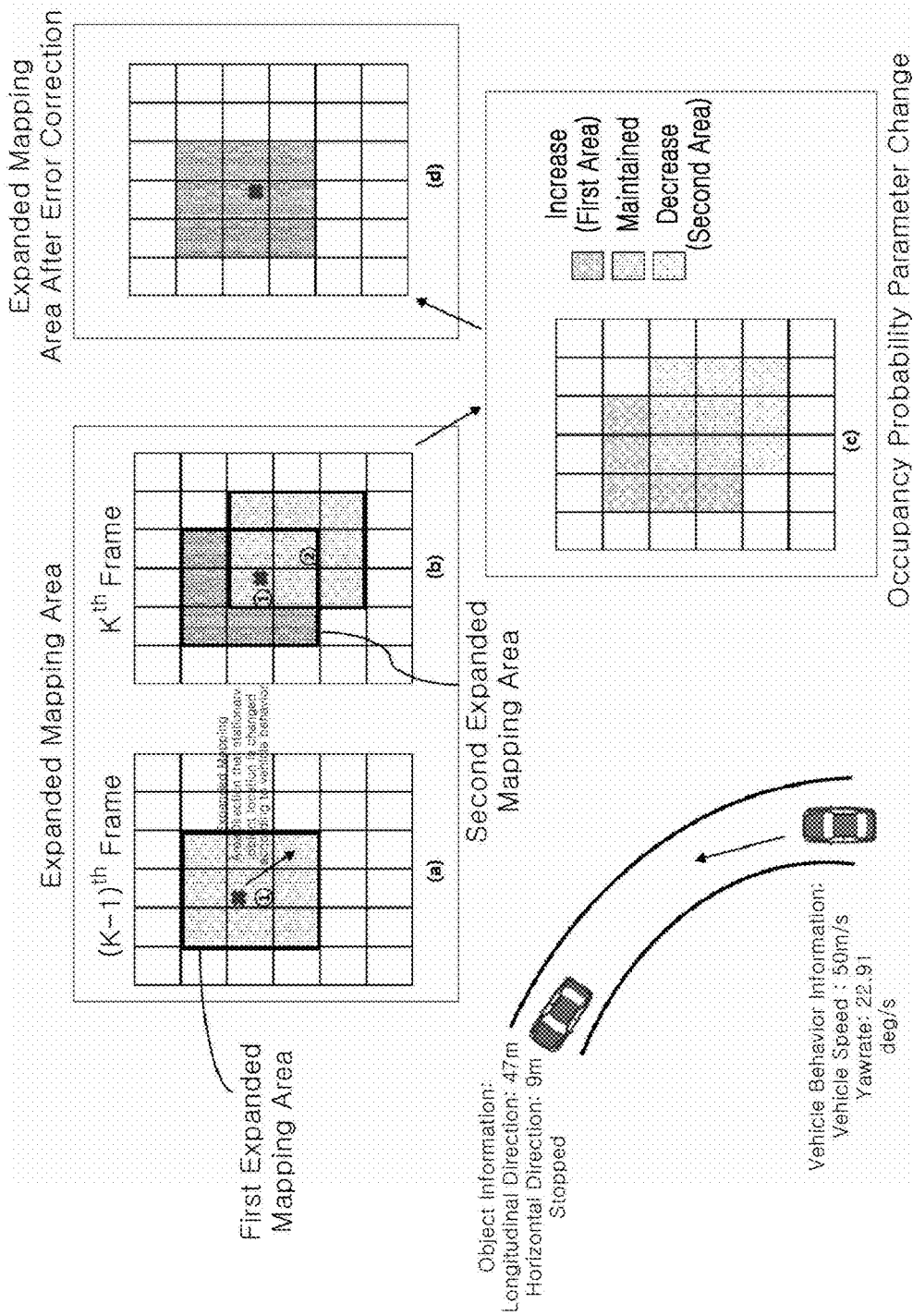
FIGS. 15 and 16 are diagrams illustrating a process of correcting an occupancy probability parameter in the apparatus for monitoring the surrounding environment of a vehicle in accordance with the embodiment of the present disclosure.
Figure 33:
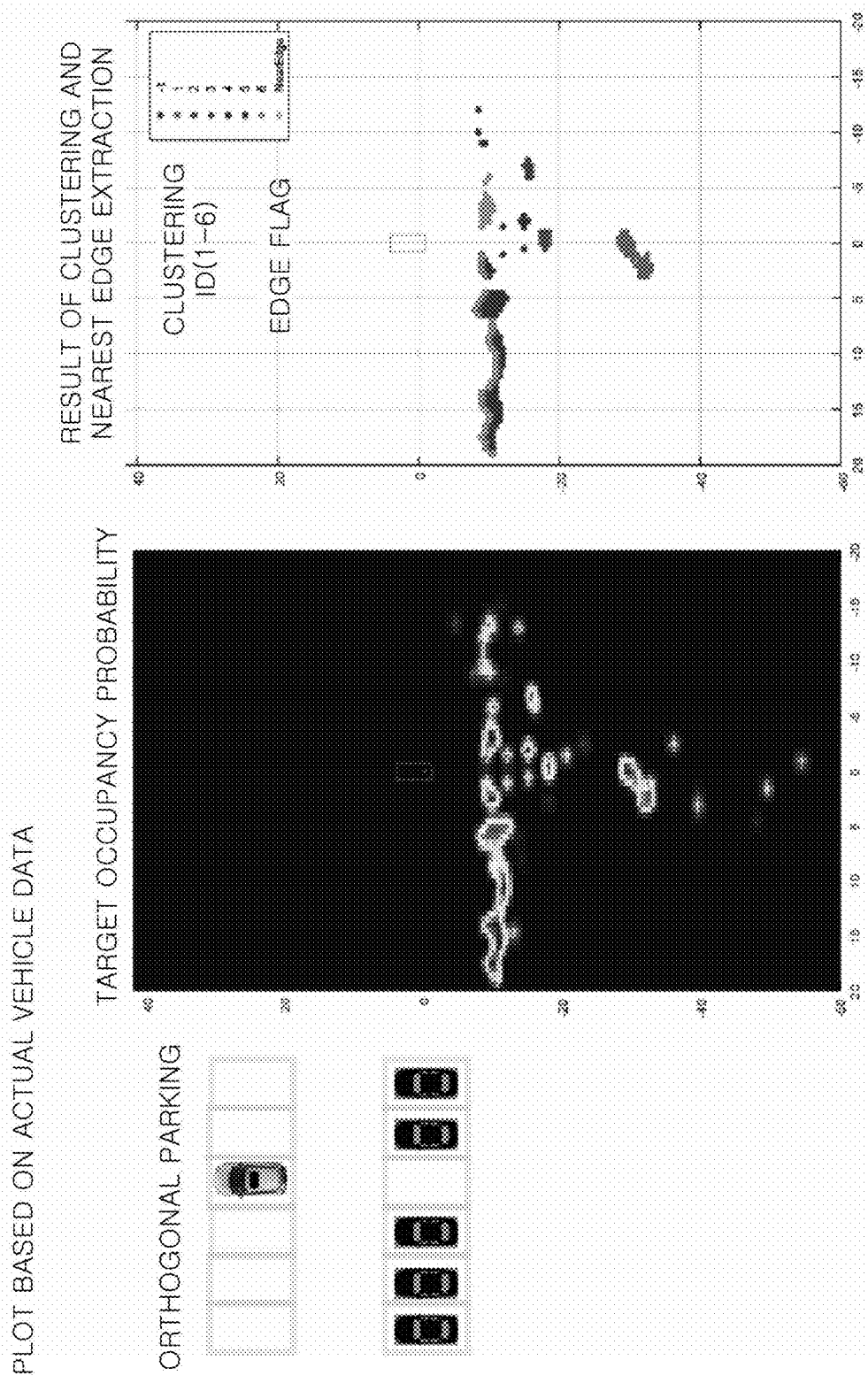
Figure 34:
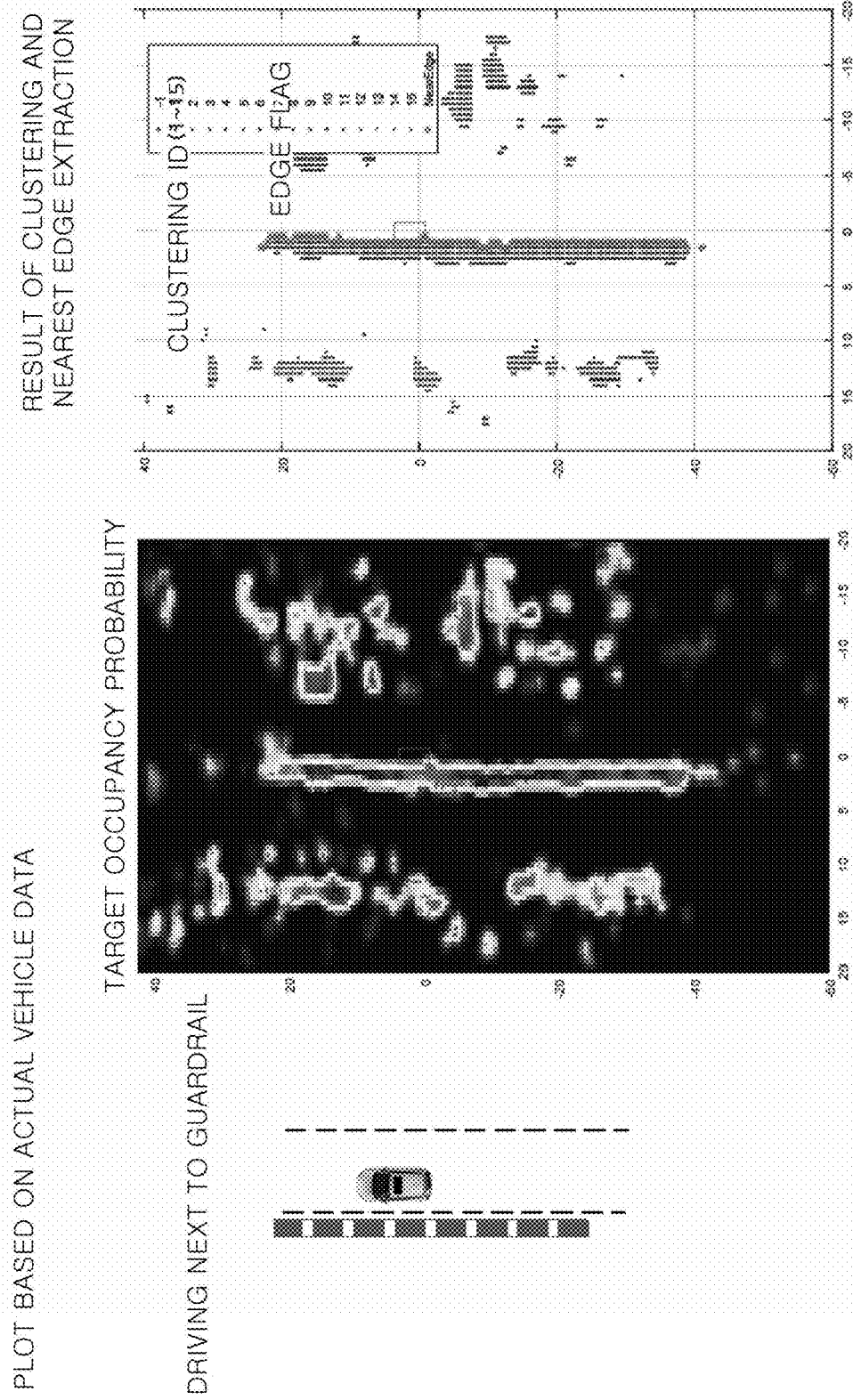
Figure 35:
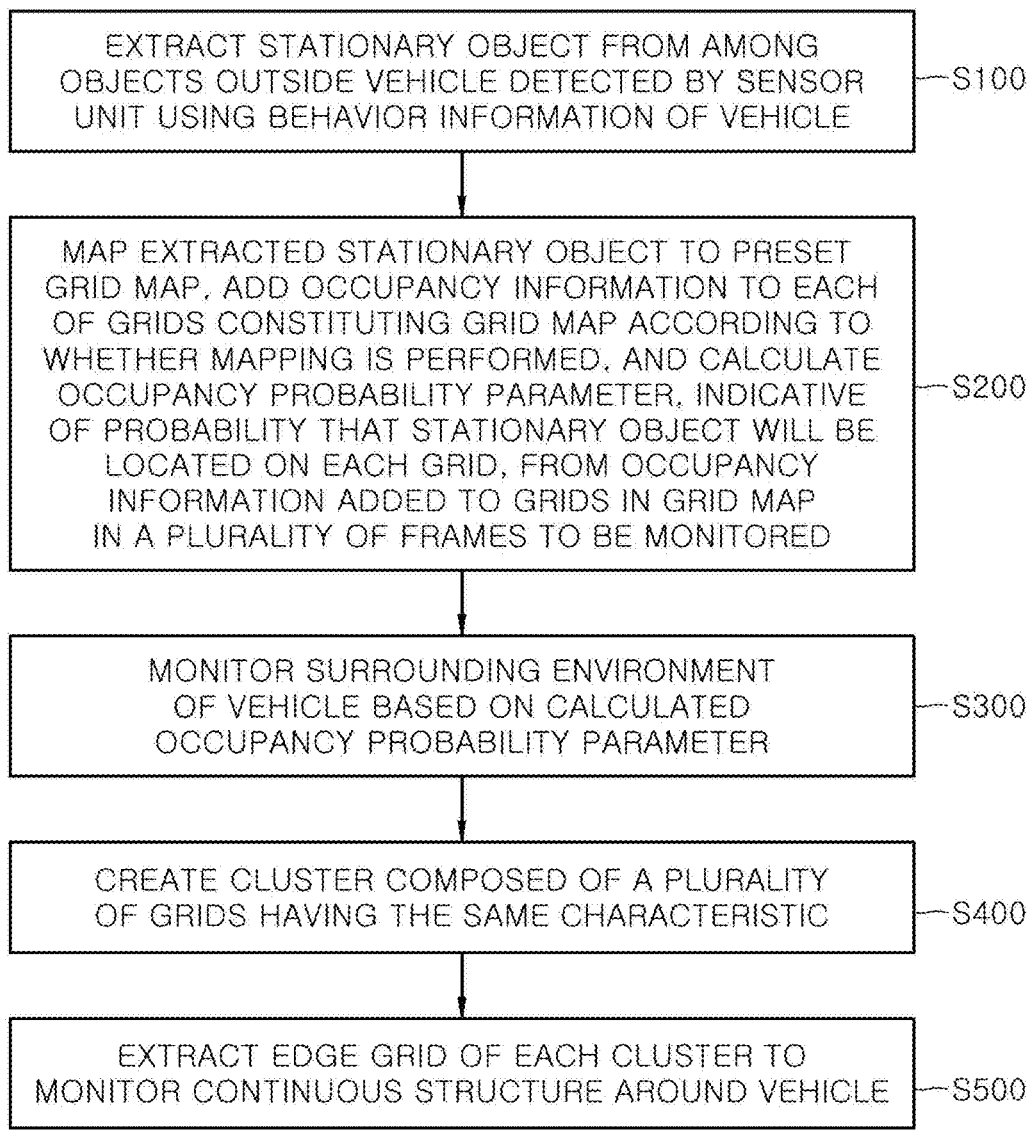
FIG. 35 is a flowchart for explaining a method of monitoring a surrounding environment of a vehicle in accordance with an embodiment of the present disclosure.

FIG. 2 is a block configuration diagram for describing an apparatus for monitoring the surrounding environment of a vehicle in accordance with an embodiment of the present disclosure, FIG. 3 is a diagram illustrating a grid map in the apparatus for monitoring the surrounding environment of a vehicle in accordance with the embodiment of the present disclosure, FIGS. 4 to 8 are diagrams illustrating a process of setting threshold values of the grid map in the apparatus for monitoring the surrounding environment of a vehicle in accordance with the embodiment of the present disclosure, FIGS. 9 and 10 are diagrams illustrating a process of updating the grid map in the apparatus for monitoring the surrounding environment of a vehicle in accordance with the embodiment of the present disclosure, FIG. 11 is a diagram illustrating a process of mapping a stationary object to the grid map in the apparatus for monitoring the surrounding environment of a vehicle in accordance with the embodiment of the present disclosure, FIGS. 12 to 14 are diagrams illustrating a process of deciding an expanded mapping area in the apparatus for monitoring the surrounding environment of a vehicle in accordance with the embodiment of the present disclosure, FIGS. 15 and 16 are diagrams illustrating a process of correcting an occupancy probability parameter in the apparatus for monitoring the surrounding environment of a vehicle in accordance with the embodiment of the present disclosure, and FIGS. 17 to 20 are diagrams illustrating a process of correcting a shaded grid in the apparatus for monitoring the surrounding environment of a vehicle in accordance with the embodiment of the present disclosure. FIGS. 21 to 28 are diagrams illustrating a process of recognizing a free space in the apparatus for monitoring the surrounding environment of a vehicle in accordance with the embodiment of the present disclosure. FIGS. 29 to 34 are diagrams illustrating a process of monitoring a continuous structure in the apparatus for monitoring the surrounding environment of a vehicle in accordance with the embodiment of the present disclosure. FIG. 35 is a flowchart for explaining a method of monitoring a surrounding environment of a vehicle in accordance with an embodiment of the present disclosure.

Referring to FIG. 2, the apparatus for monitoring the surrounding environment of a vehicle in accordance with the embodiment of the present disclosure may include a sensor unit 100 and a control unit 200 (may also be referred to as the controller 200).

Figure 1B:
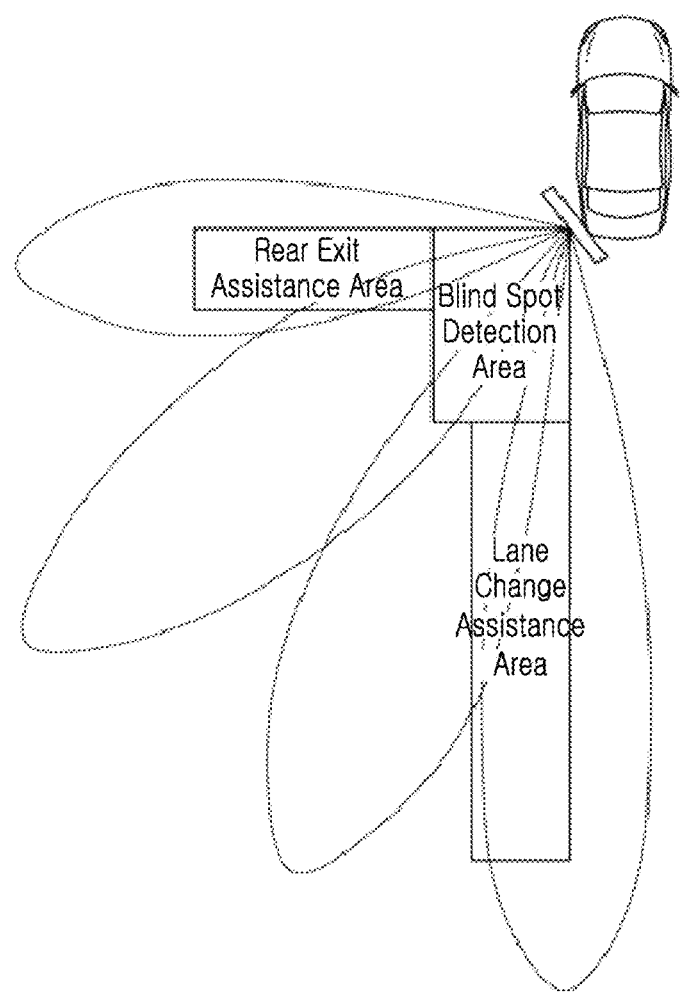

The sensor unit 100 may include first to fourth detection sensors 110, 120, 130, and 140 corresponding to radar sensors of the vehicle. As illustrated in FIG. 2, the first detection sensor 110 may correspond to a rear right (RR) radar sensor, the second detection sensor 120 may correspond to a rear left (RL) radar sensor, the third detection sensor 130 may correspond to a front right (FR) radar sensor, and the fourth detection sensor 140 may correspond to a front left (FL) radar sensor. Therefore, the detection sensors 110, 120, 130, and 140 may operate to detect an outside object through a method of transmitting a radar signal according to frames with a predefined period and receiving a signal reflected from the outside object. Furthermore, depending on a DAS (Driver Assistance System) (e.g. BSD, LCA or RCTA) to which a radar sensor is applied as illustrated in FIGS. 1A and 1B, the waveform, frequency, distance resolution, angle resolution, maximum sensing distance, and FoV of a radar signal transmitted from the radar sensor may have different characteristics for the respective frames.

The control unit 200 serves to monitor the surrounding environment of the vehicle by controlling an operation of the DAS of the vehicle, and may be implemented as an ECU (Electronic Control Unit), processor, CPU (Central Processing Unit) or SoC (System on Chip). The control unit 200 may drive an operating system or application to control a plurality of hardware components or software components connected to the control unit 200, and perform various data processing operations.

In the present embodiment, the control unit 200 may operate to extract a stationary object among outside objects detected by the sensor unit 100 by using behavior information of the vehicle, map the extracted stationary object to a preset grid map, and add occupancy information to each of grids constituting the grid map depending on whether the stationary object is mapped to the grid map. Furthermore, the control unit 200 may operate to calculate an occupancy probability parameter indicating the probability that the stationary object will be located at each of the grids, from the occupancy information added to the grids within the grid map in a plurality of frames to be monitored, and monitor the surrounding environment of the vehicle on the basis of the calculated occupancy probability parameter.

Hereafter, the process of monitoring the surrounding environment of the vehicle will be described in detail for each of the detailed operations of the control unit 200.

1. Stationary Object Extraction

First, the control unit 200 may extract a stationary object among outside objects detected by the sensor unit 100 by using behavior information of the vehicle and object information acquired on the basis of a result obtained by detecting the outside objects through the sensor unit 100. That is, the descriptions of the present embodiment will be focused on the configuration for monitoring a stationary object, not a moving object, among various outside objects around the vehicle.

The behavior information of the vehicle may include a vehicle speed, yaw rate, speed change information, and steering angle, and the object information may include the number of outside objects detected by the sensor unit 100, the longitudinal distance and horizontal distance to each of the objects, the longitudinal speed and horizontal speed of each of the objects, and the intensity of a received signal. The control unit 200 may extract only a stationary object among the outside objects by using the behavior information of the vehicle and the object information. For example, the control unit 200 may distinguish between a moving object and a stationary object by analyzing the relationships between the vehicle speed of the vehicle and the longitudinal/horizontal speeds of the objects, in order to extract only the stationary object.

2. Stationary Object Mapping

When the stationary object is extracted, the control unit 200 may map the extracted stationary object to the preset grid map. Before the mapping process for the stationary object, the grid map and an update process for the grid map will be preferentially described.

2-1. Grid Map

As illustrated in FIG. 3, the grid map may be set in the control unit 200 in advance, and have a size corresponding to the surrounding environment area of the vehicle, which is to be monitored. In FIG. 3, $X_{map\_max}$ represents the maximum distance in the longitudinal direction (the longitudinal size of the grid map), $Y_{map\_max}$ represents the maximum distance in the horizontal direction (the horizontal size of the grid map), $X_{map\_min}$ represents a longitudinal reference position of the grid map, $Y_{map\_min}$ represents a horizontal reference position of the grid map, $X_{map\_step}$ represents the longitudinal size of each grid, and $Y_{map\_step}$ represents the horizontal size of each grid.

The longitudinal and horizontal axes of the grid map may be set on the basis of the vehicle. If the longitudinal and horizontal axes of the grid map are set on the basis of a specific point, not the vehicle, more memory resources may be required depending on the mileage of the vehicle. Furthermore, it is effective to set, to the surrounding area of the vehicle, a surrounding environment monitoring area required for outputting a warning to a driver or performing a traveling control operation of the vehicle. Therefore, the longitudinal and horizontal axes of the grid map may be set on the basis of the vehicle. Thus, the indexes (coordinates (i, j)) of the grids constituting the grid map may also be set on the basis of the vehicle, where i and j represent the longitudinal and horizontal indexes, respectively.

Figure 4:
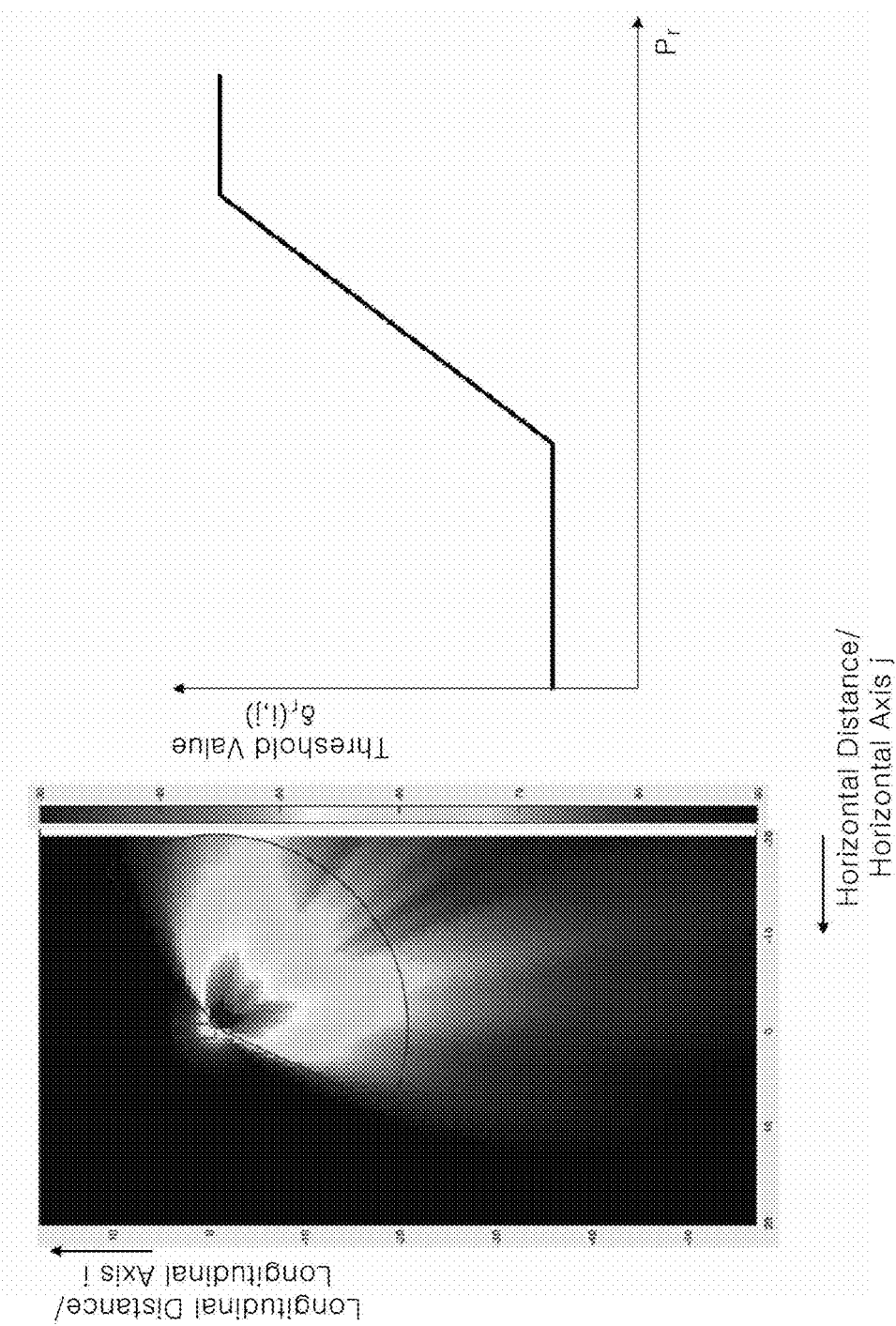
FIGS. 4 to 8 are diagrams illustrating a process of setting threshold values of the grid map in the apparatus for monitoring the surrounding environment of a vehicle in accordance with the embodiment of the present disclosure.

As illustrated in FIG. 4, a threshold value for deciding whether a stationary object occupies each of the grids within the grid map may be defined for the corresponding grid in the grid map. As will be described below, the threshold value functions as a value which is compared to an occupancy probability parameter, and serves as a reference value for determining whether the stationary object is located at the corresponding grid. The threshold value may be defined for each of the grids on the basis of a mathematical model according to the intensity of a received signal inputted to the sensor unit 100, and the mathematical model may correspond to a well-known radar equation below, where Pr represents the intensity of the received signal, Gt represents an antenna gain, and Rt represents the distance to the object:

$$P_r \propto G_{t,r}(\theta), \frac{1}{R^4}.$$

Specifically, according to the radar equation, the intensity of the received signal may differ depending on the antenna gain and the relative distance to the object. Therefore, the probability that the same object will be detected through the radar may differ depending on the location thereof. For example, when an object is located at a short distance, the intensity of a received signal is so high that the object detection probability increases, and when an object is located at a long distance, the intensity of a received signal is so low that the object detection probability decreases.

Furthermore, when an object is located at a location where the antenna gain is high, the intensity of a received signal is so high that the object detection probability increases, and when an object is located at a location where the antenna gain is low, the intensity of a received signal is so low that the object sensing detection decreases. As described above, the waveform, frequency, distance resolution, angle resolution, maximum sensing distance, and FoV of a radar signal transmitted from the radar may have different characteristics for the respective frames, depending on the DAS (e.g. BSD, LCA or RCTA) of the vehicle, to which the radar sensor is applied. Thus, each of the frames may include an area where an object can be repeatedly detected, and only a specific frame may include an area where an object can be detected. Therefore, the area which is repeated in each of the frames may have a high object detection probability, and the area which is not repeated in each of the frames may have a low object detection probability. That is because, during two frames, an object can be detected twice in an area which is repeated, but an object can be detected only once in an area which is not repeated.

Furthermore, for two adjacent radar sensors, for example, the RR radar sensor and the RL radar sensor, there may be an area where an object can be redundantly detected through the two radar sensors, and an area where an object can be detected only through one radar sensor. Therefore, the area where the object can be redundantly detected through the two radar sensors may have a high object detection probability, and the area where the object can be detected only through one radar sensor may have a low object detection probability. That is because, although one radar sensor does not detect the object in the area where the object can be redundantly detected through the two radar sensors, the object can be detected through the other adjacent radar sensor, but when one radar sensor does not detect the object in the area where the object can be detected only through one radar sensor, the object cannot be detected through the other adjacent radar sensor.

Through the above-described contents, two situations may be considered.
i) Case in which the object detection probability is the highest: an 'area where an object is located at a short distance and the antenna gain is high', a 'detection area repeated in each frame', and a 'detection area redundant between the adjacent radar sensors'
i) Case in which the object detection probability is the lowest: an 'area where an object is located at a long distance and the antenna gain is low, a 'detection area which is not repeated in each frame', and a 'detection area which is not redundant between the adjacent radar sensors'

It may be unreasonable to set the same threshold value to all the grids, in order to decide whether a stationary object occupies each of the grids within the grid map, in the two above cases. That is because, in case (i), it may be falsely determined that an object is present, even though no object is actually present (false detection), and in case (ii), it may be falsely determined that no object is present, even though an object is actually present (missing detection). Thus, in the present embodiment, the threshold values for the respective grids may be differently set depending on the object detection probability, which makes it possible to prevent the false determination (false detection and missing detection).

Specifically, the threshold value may be set to different values for an independent area, a single-overlap area, and a multi-overlap area within the grid map.

Figure 5:
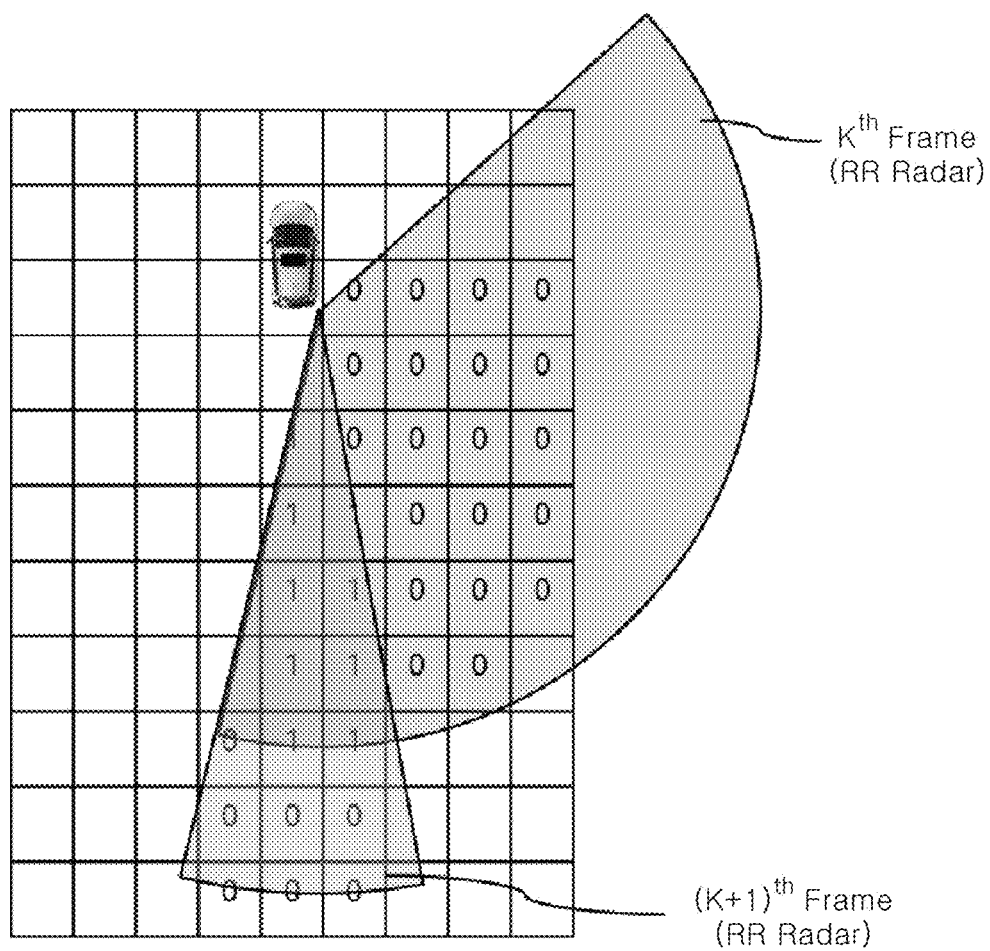

The independent area may be defined as an area within the grid map, which is sensed by the first detection sensor 110 in a $K^{th}$ frame, where K is a natural number, and the single-overlap area may be defined as an area within the grid map, in which an independent area and an area sensed by the first detection sensor 110 overlap each other in a $(K+1)^{th}$ frame distinguished from the $K^{th}$ frame (following the $K^{th}$ frame). That is, the independent area and the single-overlap area are distinguished from each other, according to whether the detection areas overlap each other for the same detection sensor in the respective frames. In FIG. 5 in which the first detection sensor is the RR radar, the grid of the independent area is designated by '0', and the grid of the single-overlap area is designated by '1'. The threshold value of the grid of the independent area may be set to a lower value than that of the grid of the single-overlap area, which makes it possible to compensate for false detection and missing detection which may occur for an object located in the independent area.

Figure 6:
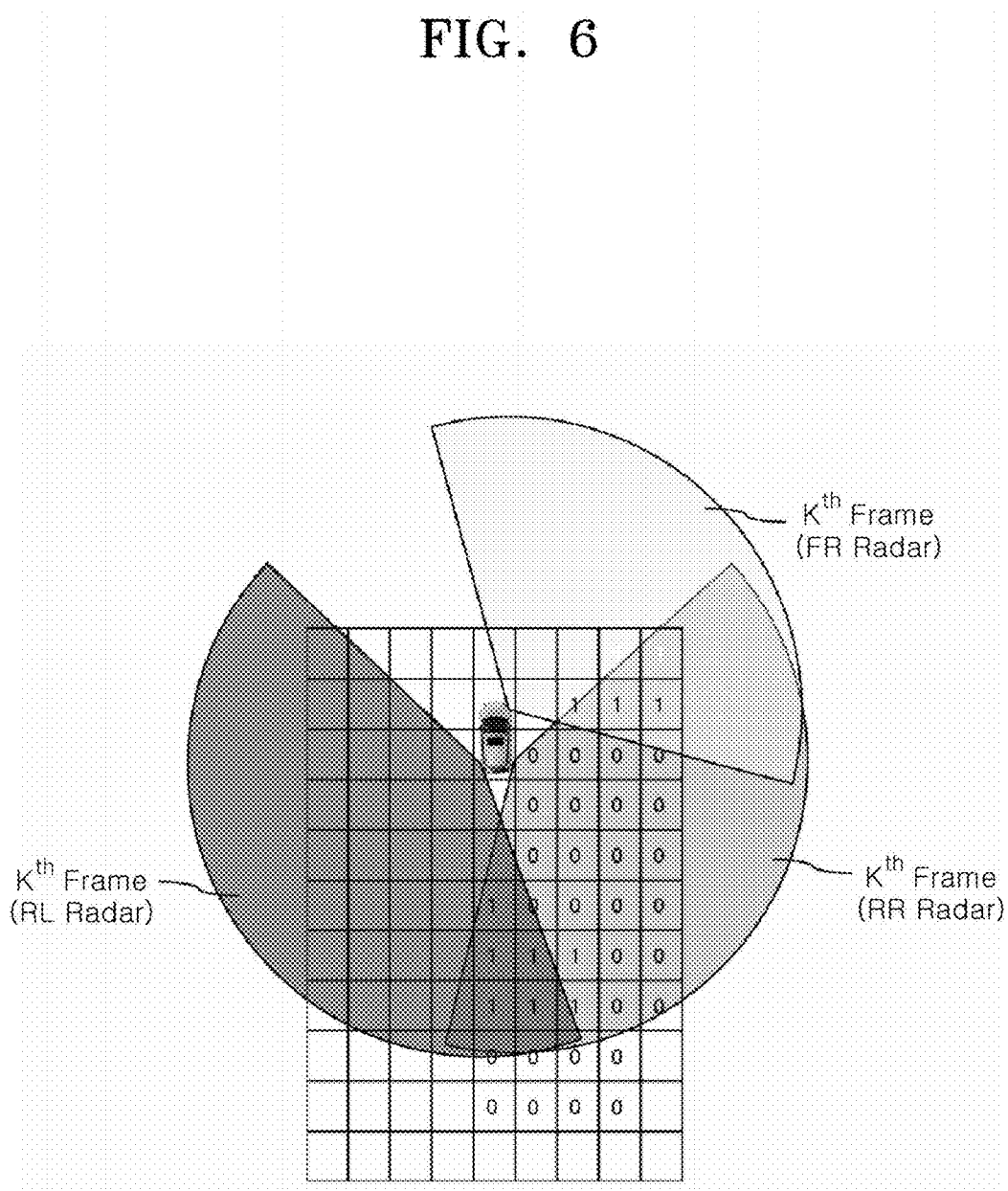
Figure 7:
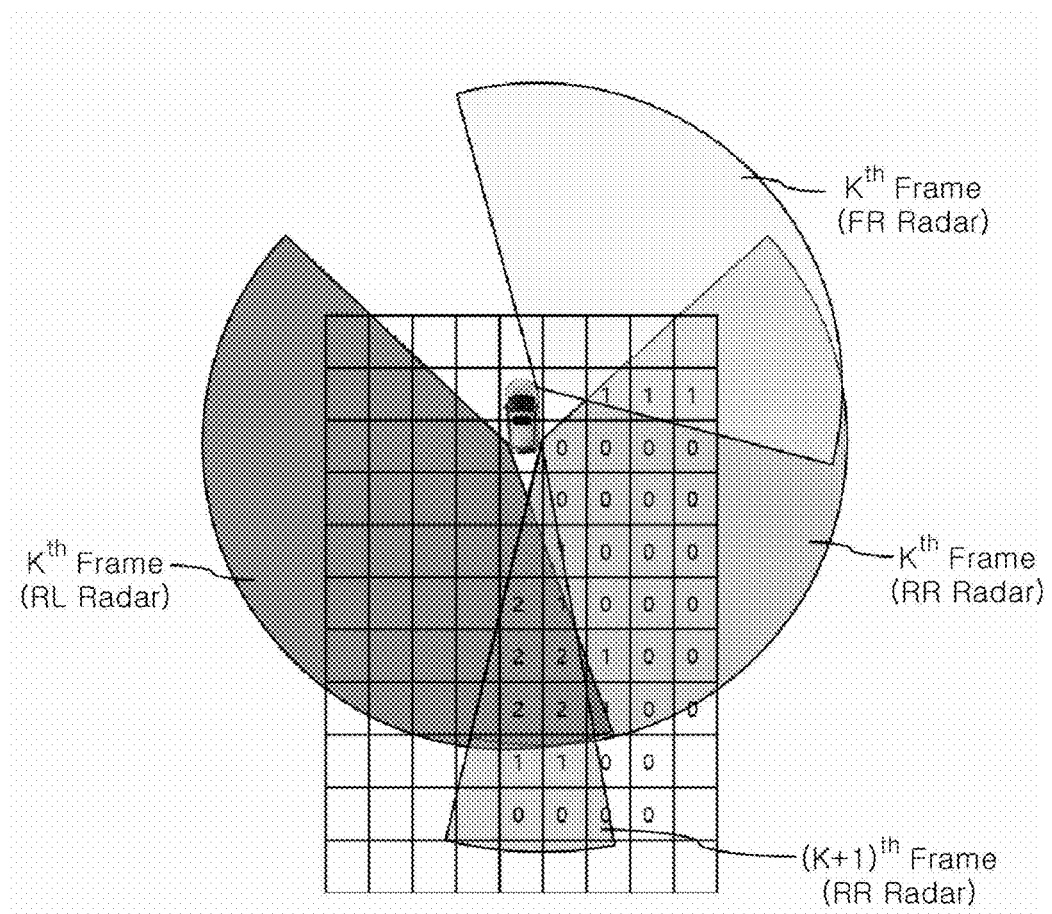
Figure 8:
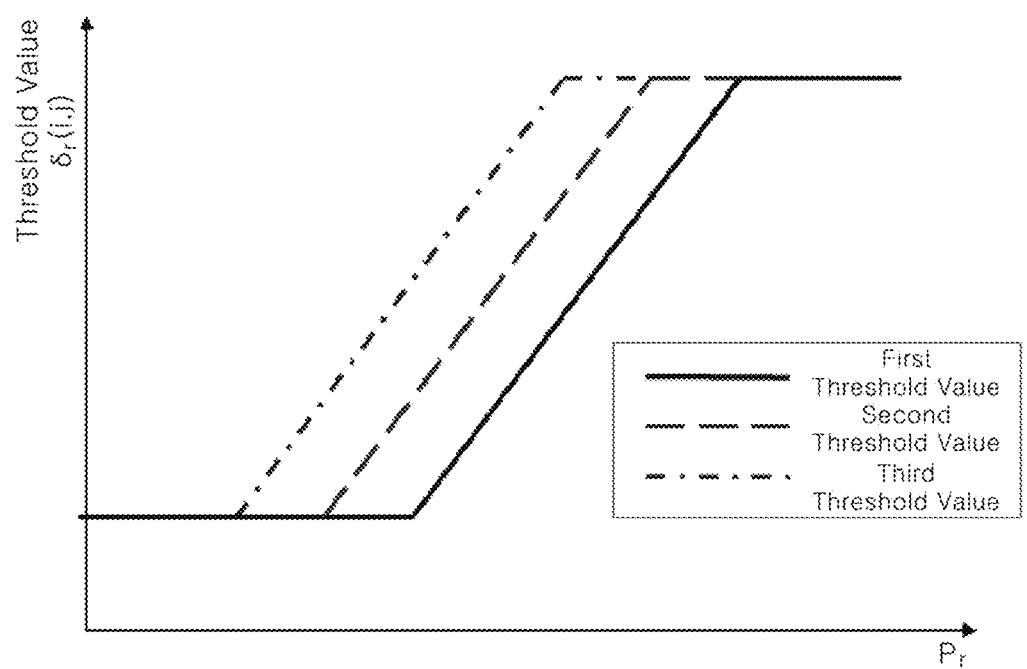

The multi-overlap area may be defined as an area within the grid map, in which an area sensed by the second detection sensor 120 adjacent to the first detection sensor 110 overlaps a single-overlap area in the same frame ($K^{th}$ or $(K+1)^{th}$ frame). That is, the multi-overlap area is decided according to whether areas detected by two adjacent detection sensors overlap each other in the same frame. In FIG. 6 in which the first detection sensor is the RR radar and the second detection sensor is the RL radar, the grid of an area sensed by the first detection sensor 110 is designated by '0', and the grid of the area where areas sensed by the first and second detection sensors 110 and 120 overlap each other is designated by '1'. Thus, as illustrated in FIG. 7 in which the first detection sensor is the RR radar and the second detection sensor is the RL radar, the grid map may be divided into the independent area '0' sensed by the first detection sensor 110 in the $K^{th}$ frame, the single-overlap area '1' which is an overlap area between the areas sensed by the first detection sensor 110 in the $K^{th}$ frame and the $(K+1)^{th}$ frame, and the multi-overlap area '2' which is an overlap area sensed by the first and second detection sensors 110 and 120 in the same frame and overlaps the single-overlap area. When the threshold values of the independent area, the single-overlap area, and the multi-overlap area are defined as a first threshold value, a second threshold value, and a third threshold value, respectively, a relationship of 'first threshold value<second threshold value<third threshold value' may be established in a section where the threshold values linearly increase as illustrated in FIG. 8.

2-2. Grid Map Update

As described above, since the longitudinal axis, horizontal index, and indexes of the grid map are set on the basis of the vehicle, the indexes of the grid map are changed by the behavior of the vehicle. Thus, a process of updating the grid map by changing the indexes of the grid map is needed in order to map a stationary object to the grid map. Furthermore, even after the stationary object is mapped to the grid map, the index of the grid to which the stationary object is mapped needs to be changed according to the behavior of the vehicle. When the grid map is updated after the stationary object is mapped to the grid map, the index of the grid to which the stationary object is mapped is also changed.

For this operation, the control unit 200 may update the grid map when a longitudinal moving distance of the vehicle is larger than the longitudinal size of the grid or a horizontal moving distance of the vehicle is larger than the horizontal size of the grid during a period from a $(K-1)^{th}$ frame to the $K^{th}$ frame. In this case, the control unit 200 may change the indexes of the respective grids in the $(K-1)^{th}$ frame from those in the $K^{th}$ frame, on the basis of the longitudinal moving distance, the horizontal moving distance, and a longitudinal angle change of the vehicle.

In order to take, as an example of a changed index, the index of a grid at which a stationary object is located, FIG. 9A illustrates the grid map in the $(K-1)^{th}$, frame with the index of the grid at which the stationary object is located.

When the vehicle travels in the longitudinal direction by a distance larger than the longitudinal size of the grid as illustrated in FIG. 9B, the index of the stationary index on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. When the vehicle makes a turn according to a predetermined yaw rate as illustrated in FIG. 9C such that the longitudinal or horizontal moving distance of the vehicle becomes smaller than the longitudinal or horizontal size of the grid, the index of the stationary object on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. In this case, an angle change based on the yaw rate may be reflected into the update of the grid map.

The update process for the grid map based on FIGS. 9A to 9C will be described with reference to modeling of FIG. 10.

First, the control unit 200 calculates the accumulative values of yaw-axis angle changes and moving displacement changes of the vehicle during a period from the $(K-1)^{th}$ frame to the $K^{th}$ frame, according to Equation 1 below.

$$-\Delta\theta\_acc = \Delta\theta\_acc + \Delta\theta - \Delta\gamma = Vs^*dt = |\Delta\gamma| \cdot \cos(\Delta\theta)\hat{a}_x +$$
$$|\Delta\gamma| \cdot |\sin(\Delta\theta)\hat{a}_y - \Delta\gamma\_acc = \Delta\gamma\_acc + \Delta\gamma[ \quad\quad \text{Equation 1}]$$

In Equation 1, $\Delta\theta$ represents a yaw-axis reference instantaneous angle change of the vehicle, $\Delta\theta\_acc$ represents a yaw-axis reference accumulative angle change during the period from the $(K-1)^{th}$ frame to the $K^{th}$ frame, $\Delta\gamma$ represents an instantaneous moving displacement of the vehicle, Vs represents the speed of the vehicle, dt represents a time period from the $(K-1)^{th}$ frame to the $K^{th}$ frame, represents a longitudinal unit vector, represents a horizontal unit vector, and $\Delta\gamma\_acc$ represents an accumulative moving displacement of the vehicle during the period from the $(K-1)^{th}$ frame to the $K^{th}$ frame.

The control unit 200 determines whether a grid map update condition is satisfied, according to Equation 2 below.

$$\Delta x_k = -\Delta\gamma \cdot \cos(\Delta\theta)\Delta y_k = \Delta\gamma \cdot \sin(\Delta\theta)\Delta x_k\_acc = \Delta x_k\_acc +$$
$$\Delta x_k \Delta y_k\_acc = \Delta y_k\_acc + \Delta y_k \text{ if}(|\Delta x_{k_{acc}}|>X_{map\_step})\|$$
$$(|\Delta y_{k_{acc}}|>Y_{map\_step}) \quad\quad [\text{Equation 2}]$$

In Equation 2, $\Delta x_k$ represents a longitudinal instantaneous moving distance of the vehicle, $\Delta y_k$ represents a horizontal instantaneous moving distance of the vehicle, $\Delta x_k\_acc$ represents a longitudinal accumulative moving distance of the vehicle, and $\Delta y_k\_acc$ represents a horizontal accumulative moving distance of the vehicle.

When the grid map update condition is satisfied according to Equation 2, the control unit 200 updates the grid map according to Equation 3 below.

$$\begin{bmatrix} X_{map\_update}(i) \\ Y_{map\_update}(j) \end{bmatrix} = \quad\quad [\text{Equation 3}]$$

$$\begin{bmatrix} \cos(\Delta\theta_k) & \sin(\Delta\theta_k) \\ -\sin(\Delta\theta_k) & \cos(\Delta\theta_k) \end{bmatrix} \cdot \begin{bmatrix} X_{map}(i) \\ Y_{map}(j) \end{bmatrix} + \begin{bmatrix} \Delta x_k\_acc \\ \Delta y_k\_acc \end{bmatrix}$$

$$i\_update = \text{floor}\left(\frac{X_{map\_update}(i) - X_{map\_min}}{X_{map\_step}}\right) + 1$$

$$j\_update = \text{floor}\left(\frac{Y_{map_{update}}(j) - Y_{map\_min}}{Y_{map\_step}}\right) + 1$$

In Equation 3, (i, i) represents the index of a grid, (i_update, j_update) represents the index of an updated grid, and floor represents a truncation operator. In Equation 3, the matrix functions as a rotation matrix for rotating the grid map according to the yaw rate of the vehicle:

2-3. Stationary Object Mapping

The control unit 200 may convert the location information of a stationary object, i.e. the longitudinal distance and horizontal distance to the stationary object, into an index corresponding to the (updated) grid map, according to Equation 4 below.

$$I_{tgt\_n} = \text{floor}\left(\frac{X_{tgt\_n} - X_{map\_min}}{X_{map\_step}}\right) + 1 \quad\quad [\text{Equation 4}]$$

$$J_{tgt\_n} = \text{floor}\left(\frac{Y_{tgt\_n} - Y_{map\_min}}{Y_{map\_step}}\right) + 1$$

In Equation 4, $I_{tgt\_n}$ represents the longitudinal index of a target grid, $J_{tgt\_n}$ represents the horizontal index of the target grid, $X_{tgt\_n}$ represents the longitudinal distance to the stationary object, and $Y_{tgt\_n}$ represents the horizontal distance to the stationary object.

As illustrated in FIG. 11, the control unit 200 may map an extracted stationary object to the grid map by specifying a target grid of the grid map, corresponding to a changed index. In this case, the control unit 200 may add occupancy information having a first value to the target grid to which the stationary object is mapped, and add occupancy information having a second value to the other grids. In the present embodiment, the first value may be set to '1', and the second value may be set to '0'. Thus, the value '1' may be added as the occupancy information to the target grid to which the stationary object is mapped, and the value '0' may be added as the occupancy information to the other grids to which the stationary object is not mapped. Hereafter, the occupancy information added to an index (i, j) in the $K^{th}$ frame will be represented by Pmap (i, j, k).

3. Expanded Mapping Area Decision

As described above, the waveform, frequency, distance resolution, angle resolution, maximum sensing distance, and FoV of a radar signal transmitted from a radar sensor may have different characteristics for the respective frames, depending on the DAS (e.g. BSD, LCA or RCTA) of the vehicle, to which the radar sensor is applied. Therefore, although the same stationary object is detected, the index at which the stationary object is detected may be changed in each frame because the signal characteristics are different in each frame. In this case, an occupancy probability parameter to be described below may be reduced by the number of used signal waveforms. FIG. 12 illustrates results obtained when the radar sensor detects the same stationary object by transmitting radar signals with a single waveform and multiple waveforms. In the case of the multiple waveforms, grids occupied in the respective frames are distributed to reduce the probability that the stationary object will be detected, compared to the single waveform. When the threshold value of the grid map is set to a low value to compensate for the reduction in the occupancy probability parameter, the stationary object is highly likely to be falsely detected due to a clutter or noise.

In order to prevent the false detection, the control unit 200 in accordance with the present embodiment may add occupancy information to surrounding grids as well as the target grid corresponding to the detected stationary object. Specifically, as illustrated in FIG. 13, the control unit 200 may decide an expanded mapping area, which is expanded by a preset range on the basis of the target grid to which the stationary object is mapped, and calculate the occupancy probability parameter by adding the occupancy information with the first value to each of the grids constituting the expanded mapping area, in order to monitor the surrounding environment of the vehicle. The preset range expanded from the target grid may be defined in advance by a designer, in consideration of the similarity (distance resolution and speed resolution) between the signal waveforms.

FIG. 14 illustrates results obtained when the radar sensor detects the same stationary object by transmitting radar signals with a single waveform and multiple waveforms. After the expanded mapping area expanded by the present range from the target grid is set, the reduction in the probability that the stationary object will be detected may be removed even in the case of the multiple waveforms, through the following method of calculating the occupancy probability parameter for each of the grids constituting the expanded mapping area.

4. Occupancy Probability Parameter Calculation

The process of calculating the occupancy probability parameter of the grid map in the present embodiment follows an occupancy probability calculation method of a general OGM (Occupancy Grid Map) based on Equation 5 below.

$$l_t(i, j \mid R_{1:k}, V_{1:k}) = \log \frac{p(i, j \mid R_{1:k}, V_{1:k})}{1 - p(i, j \mid R_{1:k}, V_{1:k})} \text{ Log odd ratio} \quad \text{[Equation 5]}$$

$$l_t(i, j \mid R_{1:k}, V_{1:k}) =$$

$$l_{t-1}(i, j \mid R_{1:k-1}, V_{1:k-1}) + \log \frac{p(i, j \mid R_k, V_k)}{1 - p(i, j \mid R_k, V_k)} - l_0$$

$$p(i, j \mid R_{1:k}, V_{1:k}) = 1 - \frac{1}{1 + \exp(l_t(i, j \mid R_{1:k}, V_{1:k}))}$$

In Equation 5, $R_{1:k}$ represents the sensing data (the above-described object information) of the sensor unit 100 (radar sensor) from the first frame to the $K^{th}$ frame, and $V_{1:k}$ represents the behavior data (the above-described behavior information) of the vehicle from the first frame to the $K^{th}$ frame, and $l_0$ represents a prior probability (0 in the present embodiment).

When the occupancy information Pmap (i, j, k) added to each of the grids in the present embodiment is applied to the occupancy probability calculation method based on Equation 5 above, an occupancy probability parameter p is calculated according to Equation 6 below.

$$p(i, j \mid R_{1:k}, V_{1:k}) = \frac{1}{M} \sum_{m=k-M+1}^{k} P_{map}(i, j, m) \quad \text{[Equation 6]}$$

In Equation 6, M represents the number of frames to be monitored.

5. Grid Map Update Error Correction

The speed, moving displacement, and yaw-axis angle change of the vehicle, which serve as factors for determining whether the update condition of the grid map is satisfied, are acquired by the sensors applied to the vehicle. Since such sensing values inevitably contain an error, it may be determined that the update condition of the grid map has been satisfied even though the update condition of the grid map was not actually satisfied, due to the error contained in the sensing values. In this case, the grid map may be falsely updated. As described above, during the update process for the grid map, the control unit 200 operates to change the index of the target grid to which the stationary object is mapped. Thus, when the grid map is falsely updated, an error may occur between the index corresponding to the actual location of the stationary object and the index of the stationary object mapped to the falsely updated grid map. As a result, the error may cause false detection and missing detection for the stationary object.

The occurrence of the error will be described with reference to FIGS. 15A to 15D. FIG. 15A illustrates that a stationary object is mapped to a grid ① in the $(K-1)^{th}$ frame, and then the grid ① is expanded by a preset range to decide a first expanded mapping area, and FIG. 15B illustrates that the update condition of the above-described grid map is satisfied in the $K^{th}$ frame, such that the grid map is updated. Since the grid map has been updated, the index of the grid to which the stationary object is mapped is also changed, so that the grid to which the stationary object is mapped is updated into a grid ②. Furthermore, the location of the stationary object, which has been actually detected by the sensor unit 100, is still maintained at the grid ①. As a result, an error occurs between the index of the grid corresponding to the actual location of the stationary object and the index of the grid of the stationary object mapped to the updated grid map.

When the grid map is updated as the $(K-1)^{th}$ frame is switched to the $K^{th}$ frame, the control unit 200 may correct the respective occupancy probability parameters of the grids constituting a second expanded mapping area through a method of comparing the first expanded mapping area in the $(K-1)^{th}$ frame to the second expanded mapping area in the $K^{th}$ frame, thereby correcting the above-described update error.

Referring to FIG. 15C, the control unit 200 may specify a first area composed of grids whose occupancy probability parameters have increased, among the grids of the second expanded mapping area, on the basis of the $K^{th}$ frame over the $(K-1)^{th}$ frame. That is, the first area corresponds to grids which were not occupied in the $(K-1)^{th}$ frame, but are occupied in the $K^{th}$ frame. Furthermore, the control unit 200 may specify a second area composed of grids whose occupancy probability parameters have decreased, among the grids of the first expanded mapping area, on the basis of the $K^{th}$ frame over the $(K-1)^{th}$ frame. That is, the second area corresponds to grids which were occupied in the $(K-1)^{th}$ frame, but are not occupied in the $K^{th}$ frame. Furthermore, the control unit 200 may correct the respective occupancy probability parameters of the grids constituting the second expanded mapping area in the $K^{th}$ frame by substituting the occupancy probability parameters of the second area with the occupancy probability parameters of the first area. Thus, as illustrated in FIG. 15D, the expanded mapping area may be configured while being matched with the location of the stationary object, which is actually detected by the sensor unit 100. When the state in which the grids constituting the second area are not occupied lasts for a preset time, the occupancy probability parameters of the grids may be reset to '0'.

Figure 16A:
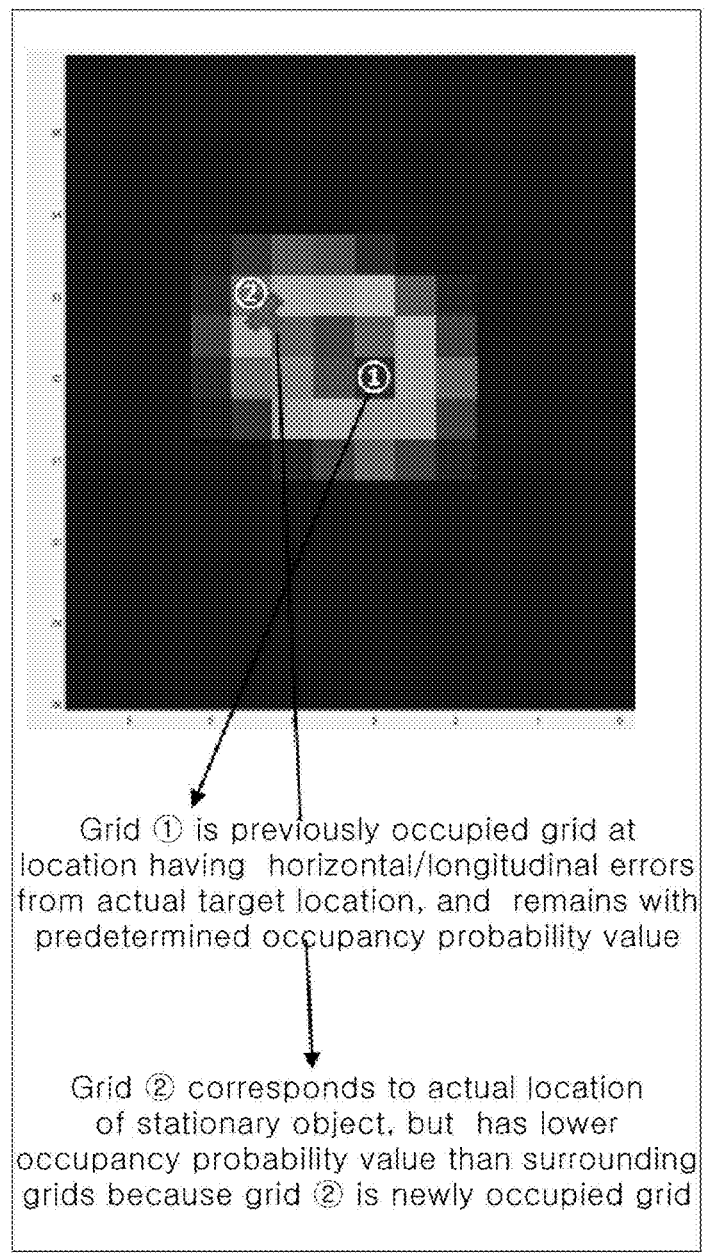

FIG. 16A illustrates an example of an occupancy probability parameter on the grid map before an update error of the grid map is updated. As described in FIG. 16A, a grid ① corresponds to a location having horizontal/longitudinal errors from the actual location of a stationary object, but remains with a predetermined occupancy probability value, and a grid ②  corresponds to the actual location of the stationary object, but has a lower occupancy probability value than surrounding grids, because the grid ② is a newly occupied grid.

Figure 16B:
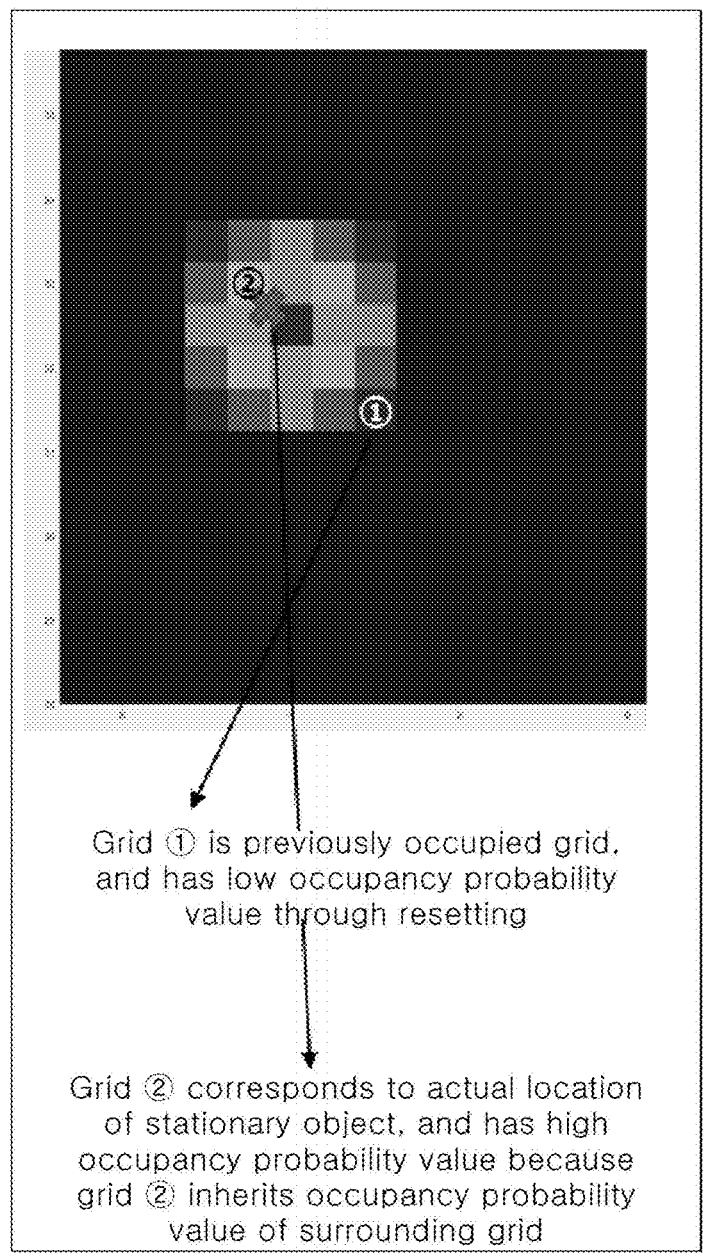

FIG. 16B illustrates an example of the occupancy probability parameter on the grid map after an update error of the grid map is corrected. As described in FIG. 16B, a grid ① is a previously occupied grid, and has a low occupancy probability value through resetting, and a grid ② corresponds to the actual location of a stationary object, and has a higher occupancy probability value than surrounding grids because the grid ② is a newly occupied grid, but inherits a predetermined occupancy probability value.

6. Correction for Shaded Area

Figure 17:
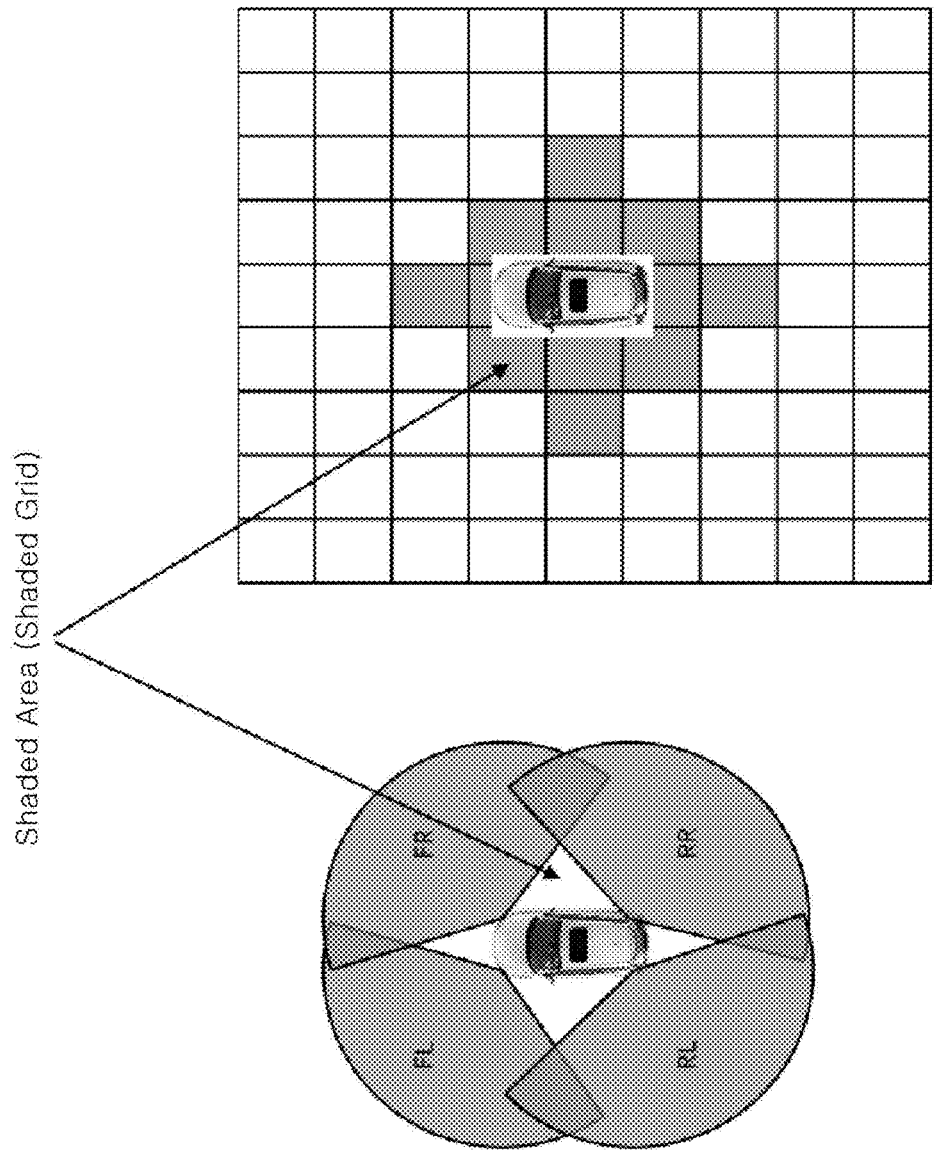
FIGS. 17 to 20 are diagrams illustrating a process of correcting a shaded grid in the apparatus for monitoring the surrounding environment of a vehicle in accordance with the embodiment of the present disclosure.

As described above, the detection sensor in accordance with the present embodiment may be implemented as a radar sensor. As illustrated in FIG. 17, a shaded area where the radar sensor cannot detect an outside object occurs due to the FoV and mounting characteristics (mounting angle and position) of the radar sensor.

In order to correct a shaded grid corresponding to the shaded area, the control unit 200 may operate to correct the shaded grid by using a first method of receiving an occupancy probability parameter in the $(K-1)^{th}$ frame or a second method of receiving an occupancy probability parameter of a grid around the shaded grid.

Figure 18:
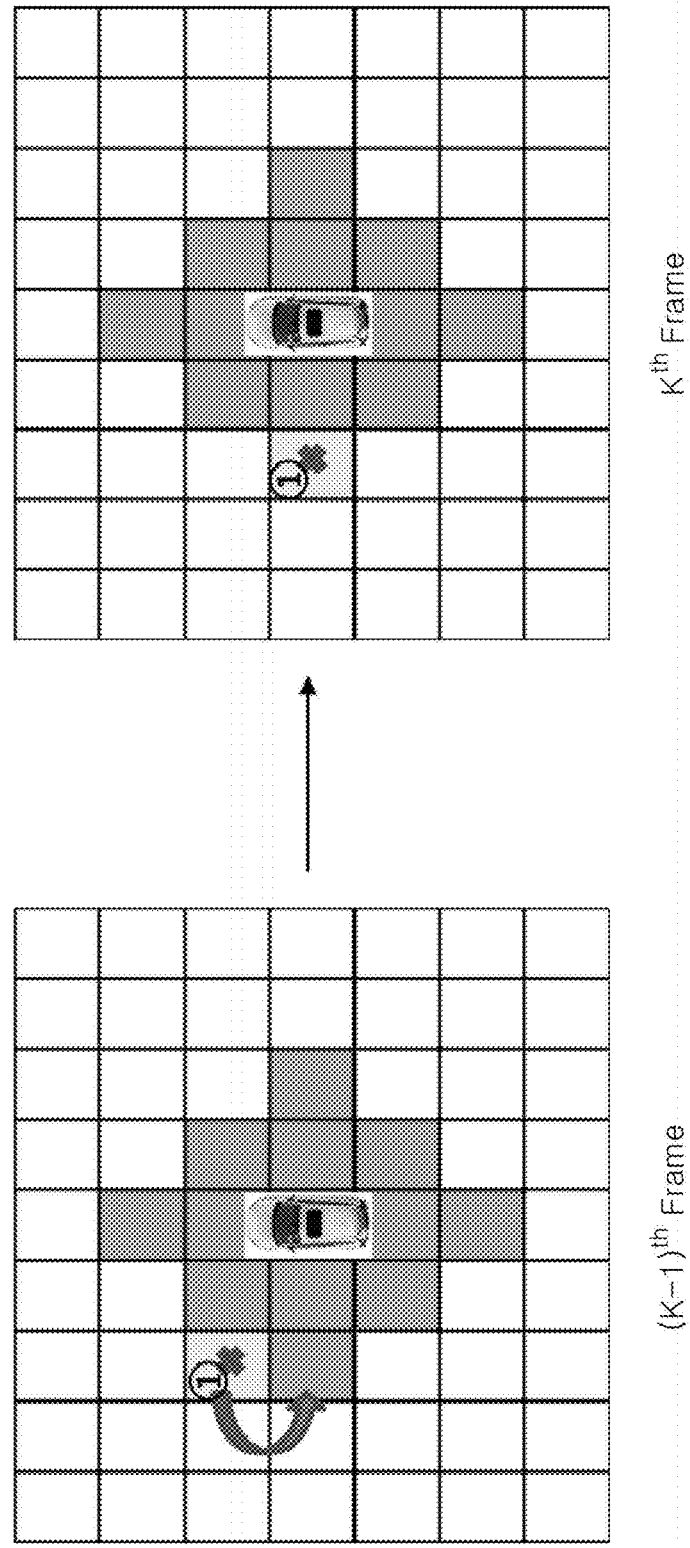

The first method may be performed when the speed of the vehicle is equal to or higher than a preset reference value or a threshold. As illustrated in FIG. 18, a grid ① in the $(K-1)^{th}$ frame does not correspond to a shaded grid, and thus retains with an occupancy probability parameter. When the vehicle speed is equal to or higher than the reference value, the update process for the grid map is performed, and the grid ① in the $K^{th}$ frame belongs to the shaded grids. In this case, the control unit 200 may set the occupancy probability parameter of the grid ① in the $(K-1)^{th}$ frame to the occupancy probability parameter of the shaded grid ① in the $K^{th}$ frame, thereby minimizing a loss caused by missing detection of the radar sensor.

Figure 19:
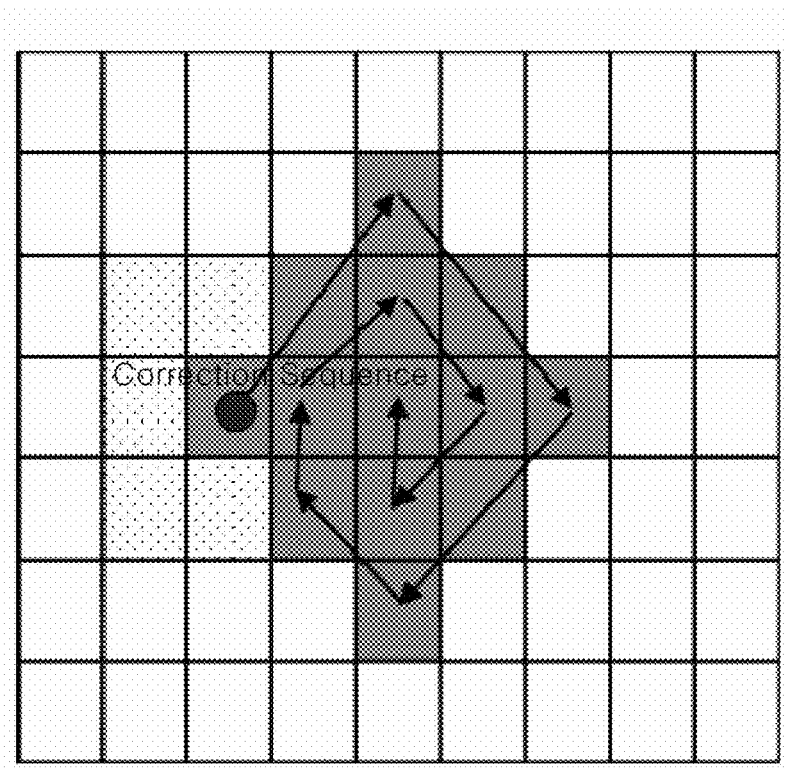
Figure 20:
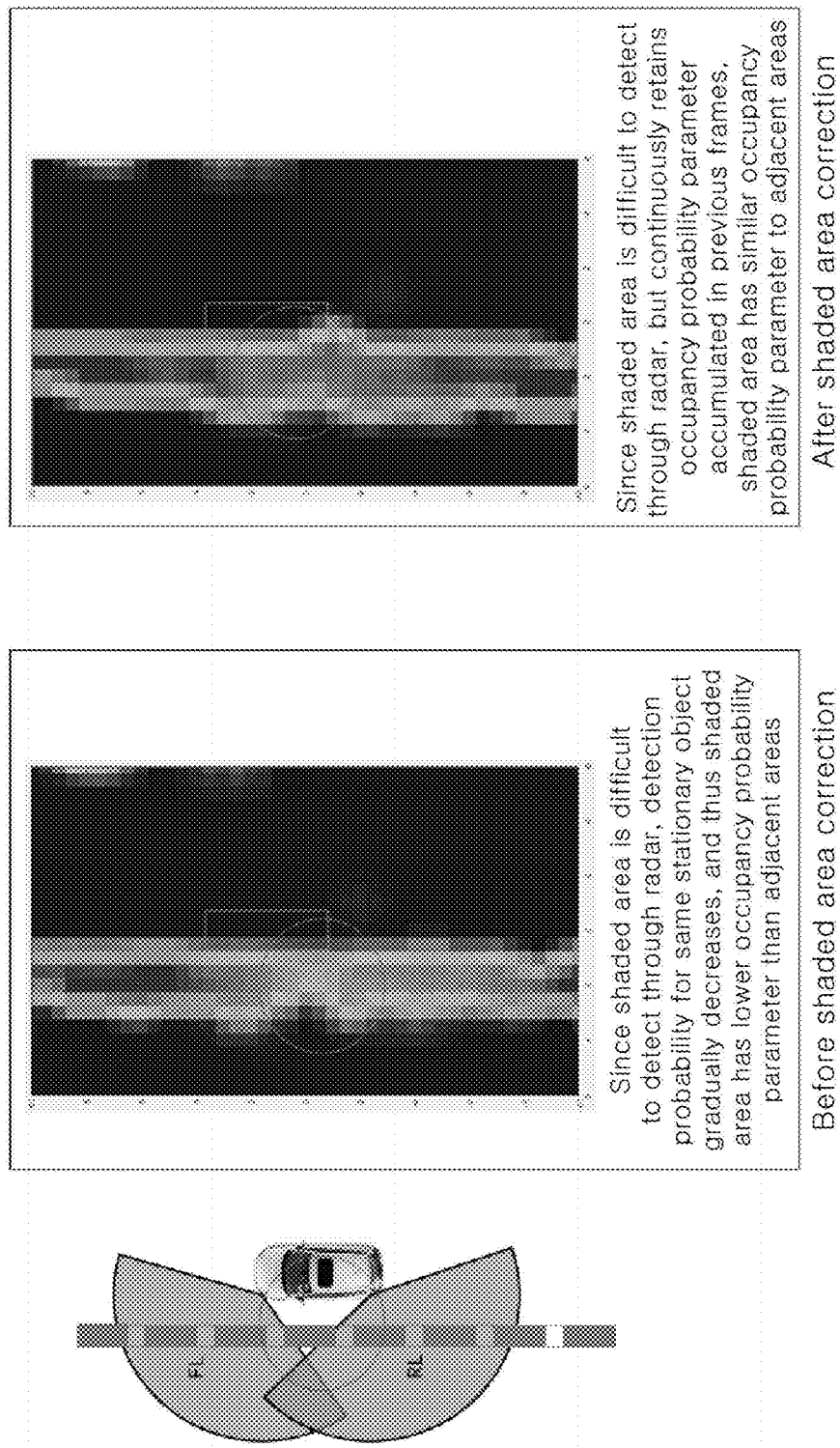

The second method may be performed when the speed of the vehicle is lower than the reference value. That is, when the vehicle travels at a very low speed or is stopped, the grid map is not updated even though the $(K-1)^{th}$ frame is switched to the $K^{th}$ frame. Thus, the first method cannot be applied. In this case, the control unit 200 may operate to set the occupancy probability parameter of a grid around a shaded grid to the occupancy probability parameter of the shaded grid. In this case, as illustrated in FIG. 19, the control unit 200 may perform the second method from a shaded grid located at the outermost position, in order to acquire the occupancy probability parameter of a grid which is not the shaded grid. The control unit 200 may set the highest occupancy probability parameter, among the occupancy probability parameters of grids located within a preset range (e.g. one grid) from the shaded grid, to the occupancy probability parameter of the corresponding shaded grid. FIGS. 20A and 20B show a result obtained by setting an occupancy probability parameter with a predetermined value to a shaded grid through the correction for the shaded area.

7. Stationary Object Location Decision (Peak Detection)

When the update of the grid map, the decision of the expanded mapping area, the update error correction, and the shaded area correction are performed through the above-described processes, the control unit 200 may operate to specify the grid at which the stationary object is highly likely to be located, on the basis of the occupancy probability parameters of the grids within the expanded mapping area.

That is, the control unit 200 may decide a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 may determine that the stationary object is located at the peak grid. The control unit 200 may monitor the surrounding environment of the vehicle by repeatedly performing the stationary object location decision method based on the 'peak detection', while the vehicle travels. The peak grid on which the stationary object is determined to be located may consist of a plurality of peak grids in relation to the driving of the vehicle. In the present embodiment, if the grid corresponding to the index (i,j) corresponds to the peak grid, it is marked with a notation of "Dmap(i,j)=1", and if the grid corresponding to the index (i,j) does not correspond to the peak grid, it is marked with a notation of "Dmap(i,j)=0".

8. Free Space Recognition

Based on the plurality of peak grids determined as described above, the control unit 200 may operate to recognize a free space around the vehicle. The free space may be a space in which safety is ensured when the vehicle moves into that space, for example, a parking space that is not occupied by other vehicles in a parking lot.

Figure 21:
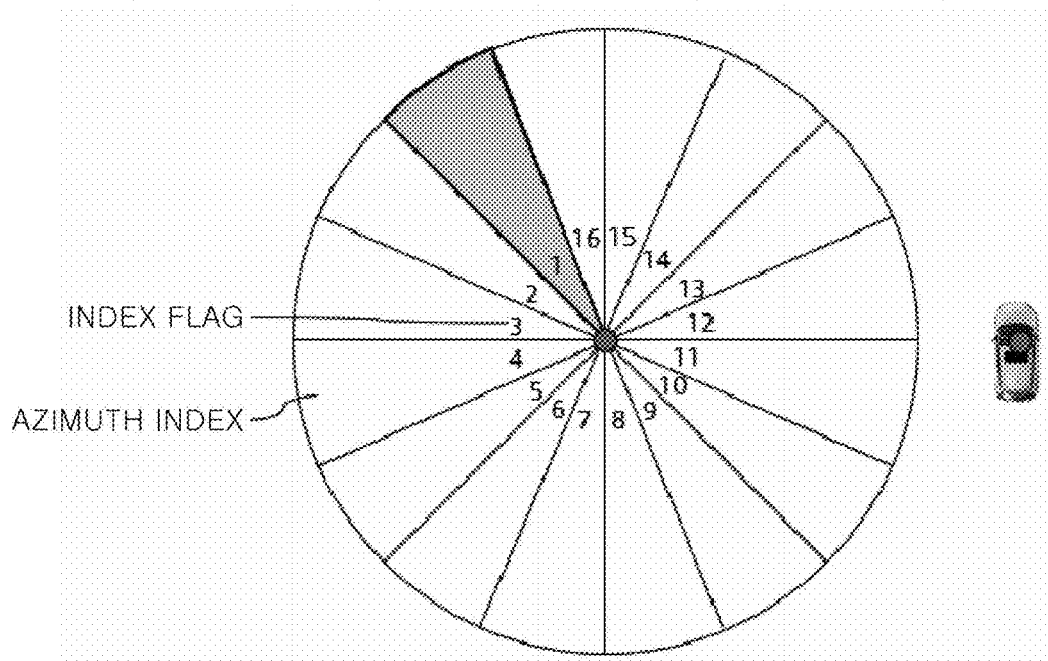
FIGS. 21 to 28 are diagrams illustrating a process of recognizing a free space in the apparatus for monitoring the surrounding environment of a vehicle in accordance with the embodiment of the present disclosure.

In connection with the map on which the free space is to be recognized, although the free space may be recognized on the grid map described above, the present embodiment adopts a configuration in which the free space is recognized on the azimuth map as illustrated in FIG. 21 in order to reduce the memory resource required to recognize the free space. As illustrated in FIG. 21, the azimuth map has a predefined set radius and has a plurality of azimuth indexes partitioned at equal radial intervals by a predefined set angle. The azimuth map may be predefined in the control unit 200 (FIG. 21 illustrates an example of the azimuth map having 16 azimuth indexes formed by the predefined set angle of 22.5°). The azimuth map has a center set with respect to the vehicle and shares longitudinal and transverse coordinates with the grid map described above. As illustrated in FIG. 21, the azimuth indexes on the azimuth map may have index flags (represented by index) having sequential values (1 to 16) set according to the sequential positions of the respective azimuth indexes.

Figure 22:
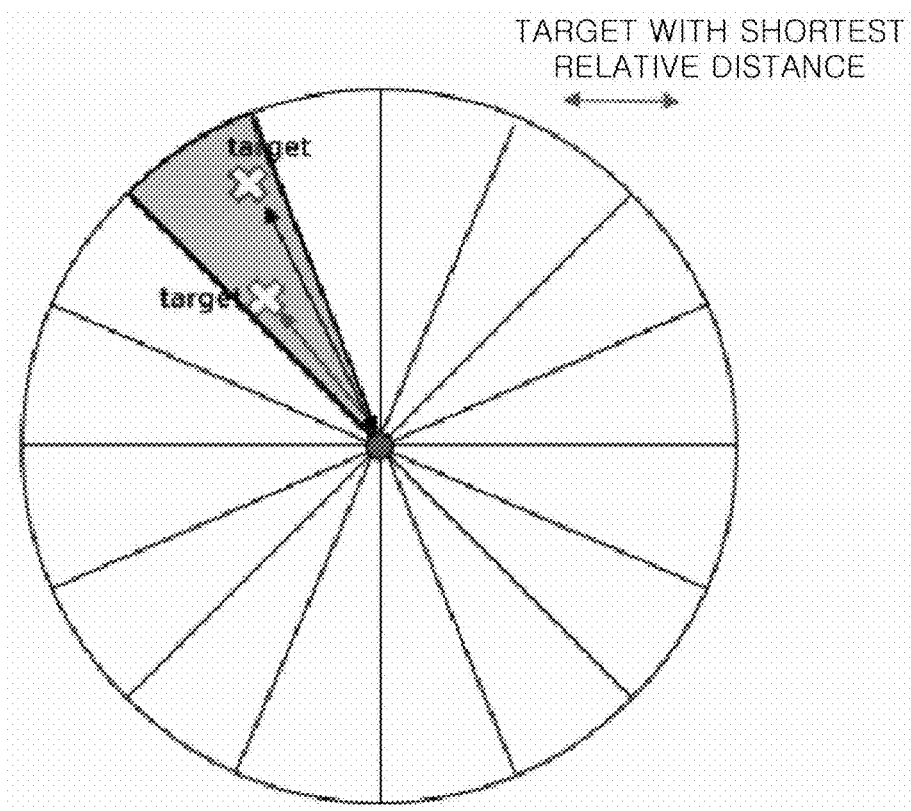
Figure 23:
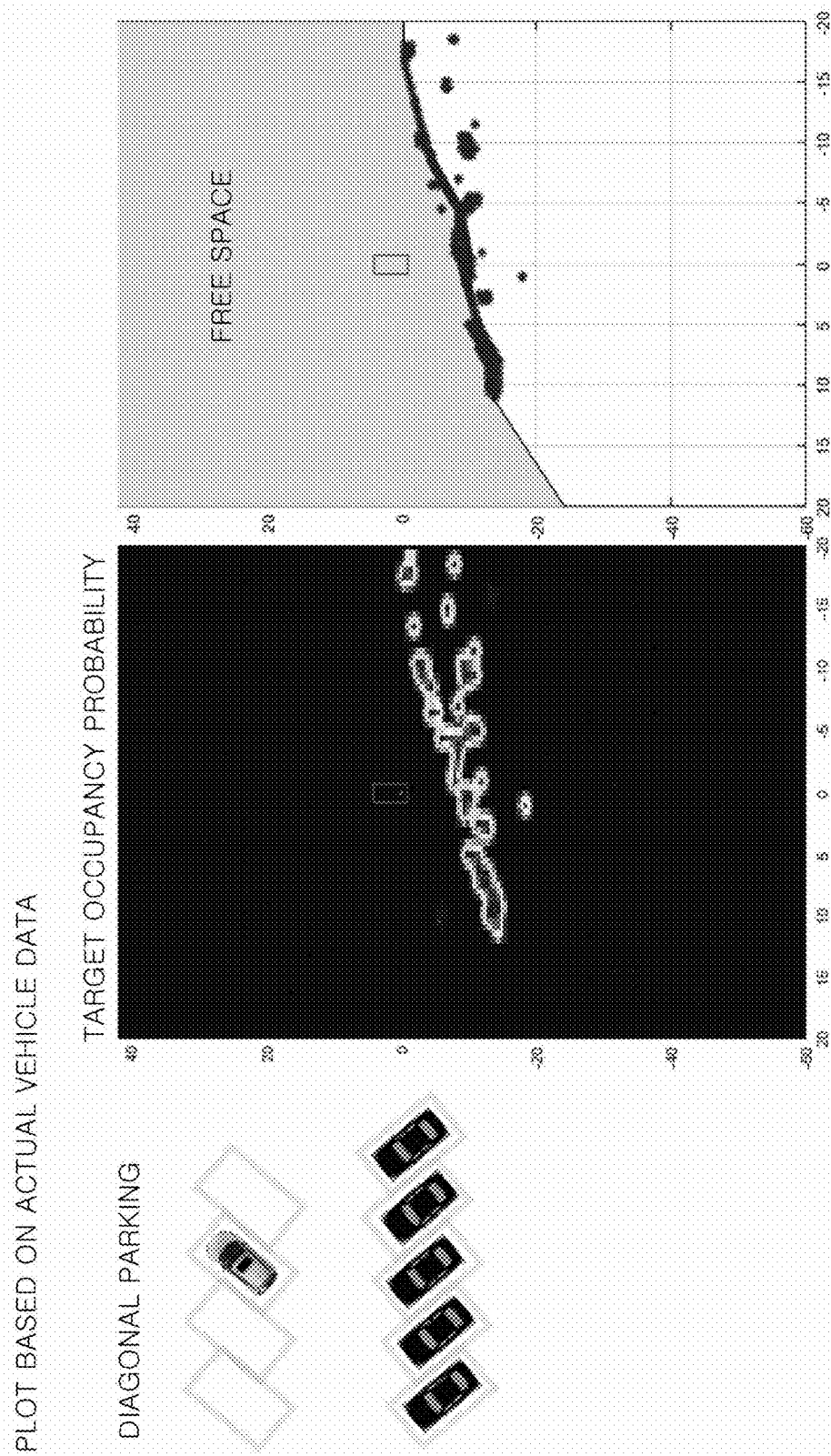
Figure 24:
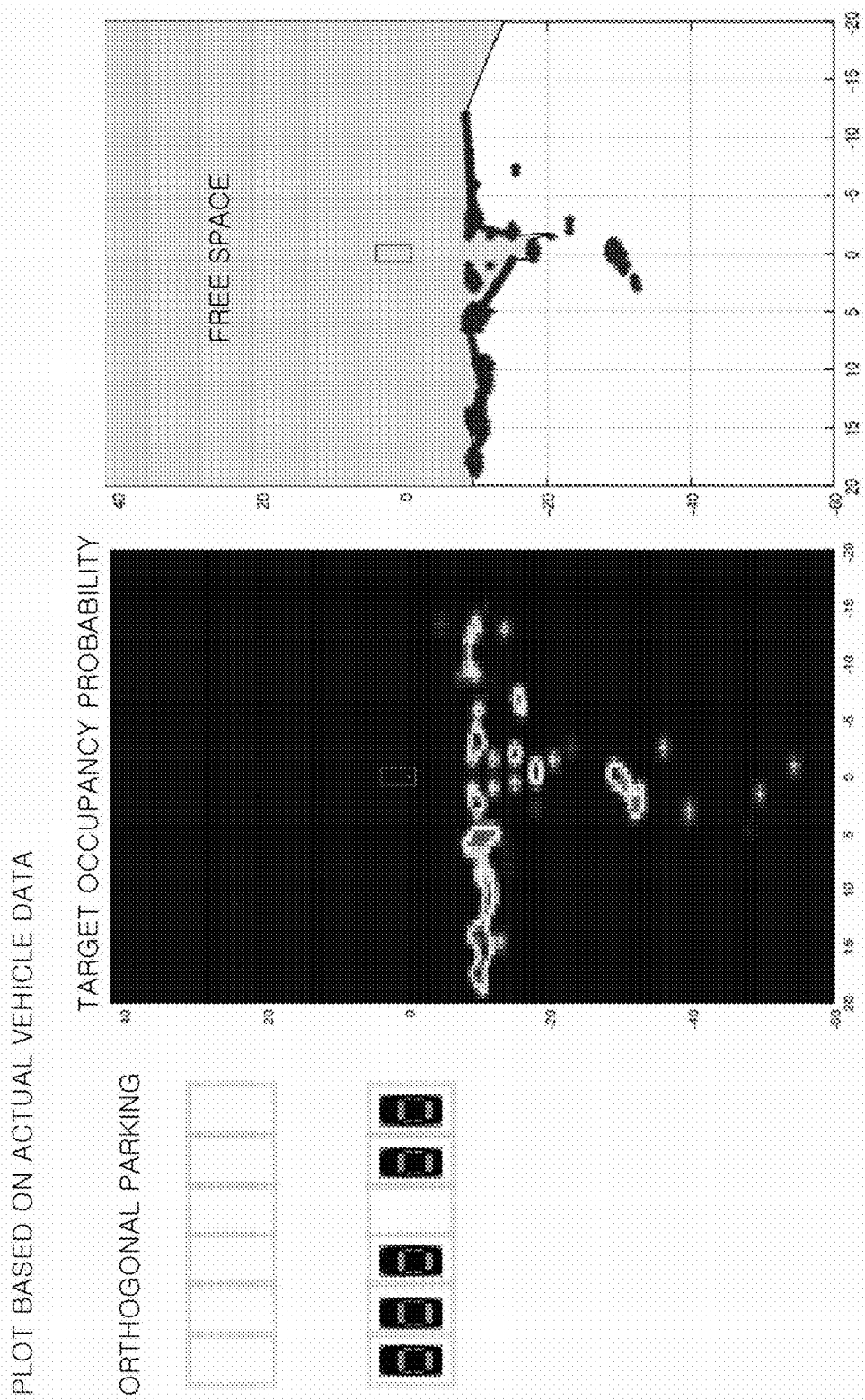

Accordingly, as illustrated in FIG. 22, the control unit 200 may map the stationary object corresponding to the previously determined peak grid to the azimuth map and recognize the azimuth index to which no stationary object is mapped as a free space around the vehicle (when a plurality of stationary objects are mapped to one azimuth index as illustrated in FIG. 22, location information of a stationary object with a minimum distance from the vehicle may be utilized for an azimuth correction process to be described later). FIG. 23 illustrates a result of free space recognition when other vehicles are parked diagonally around the vehicle. FIG. 24 illustrates a result of free space recognition when other vehicles are parked orthogonally around the vehicle.

Figure 25:
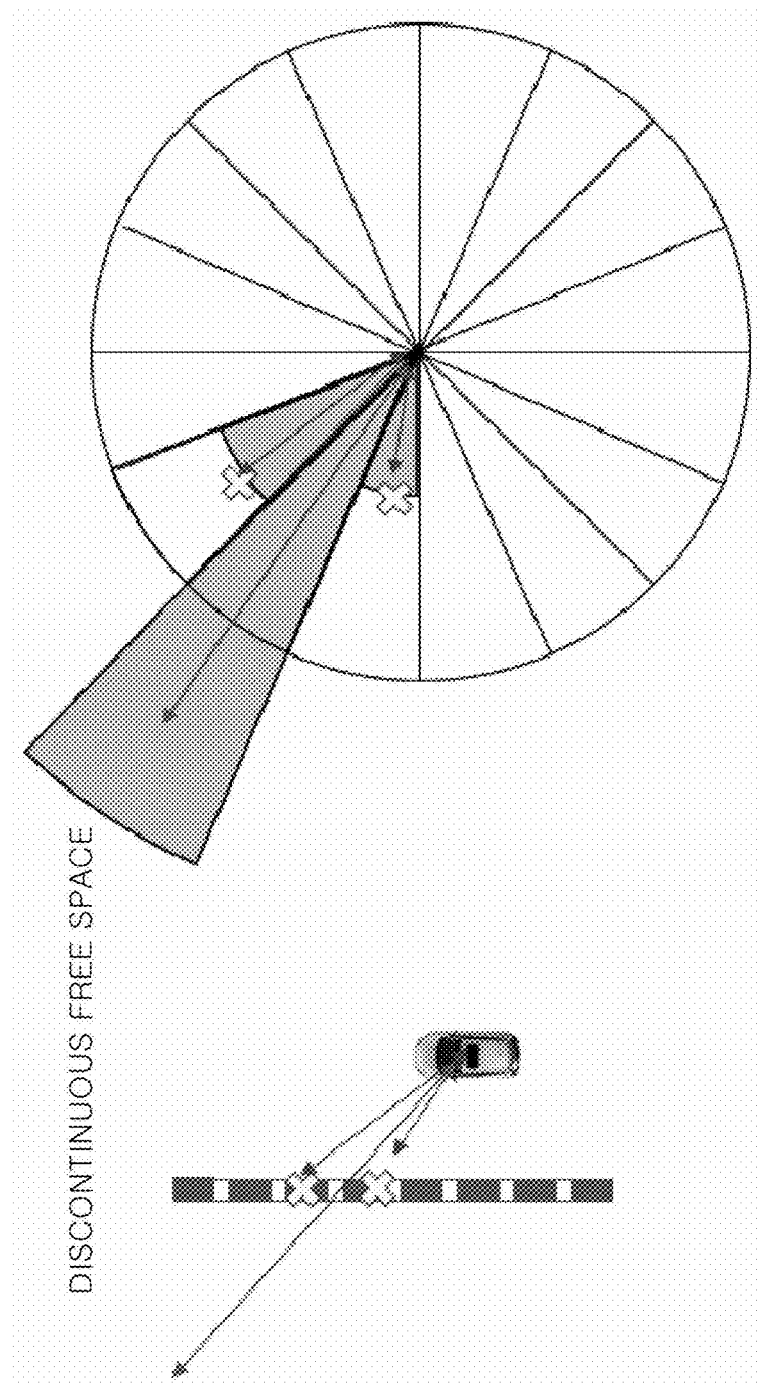
Figure 26:
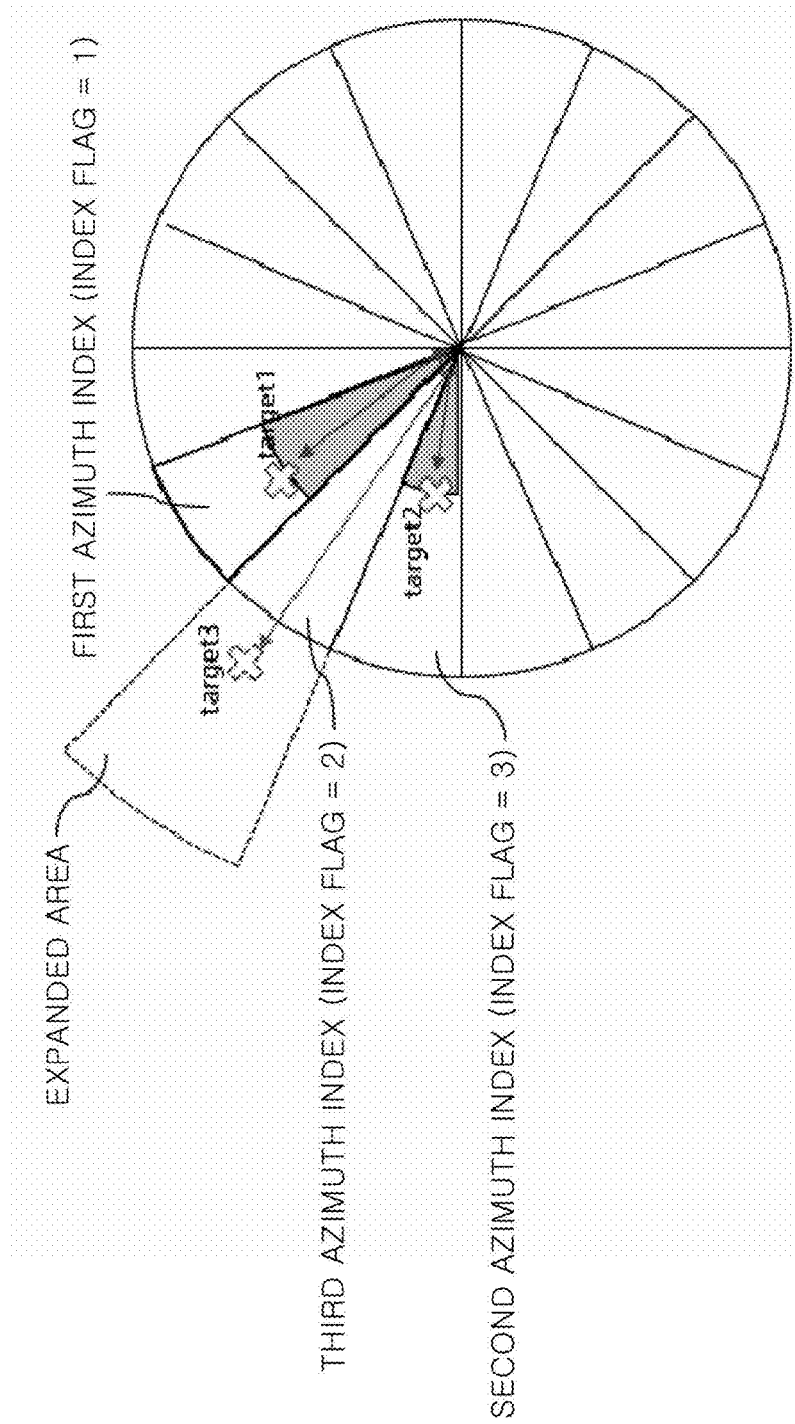

As illustrated in FIG. 25, depending on the driving situation of the vehicle, there may be a structure in which a stationary object and a free space are continuously formed (e.g., a guardrail). In this case, the free space is formed discontinuously, which does not function as a free space to ensure the safety of the vehicle. Therefore, it may be desirable in terms of driving safety of the vehicle to correct that space to a space in which a stationary object exists. Accordingly, the present embodiment adopts a configuration in which the discontinuous free space is corrected to a space in which a stationary object exists.

Specifically, when a third azimuth index to which a stationary object is not mapped exists adjacent to first and second azimuth indexes to which first and second stationary objects are mapped, respectively, and when a third stationary object exists in the area in which the third azimuth index expands radially (FIG. 26), the control unit 200 may correct the third azimuth index to an azimuth index to which the stationary object is mapped when the predefined correction condition is satisfied.

When the distances from the vehicle to the first to third stationary objects target1 to target3 are defined as first to third distances R1 to R3, respectively, the correction condition may include the following four conditions (each of the following reference values may be defined as a specific value according to the designer's intention and radar detection performance (distance resolution):

Condition i) the difference between the first and second distances is less than the reference value: |R1−R2|<reference value;

Condition ii) the third azimuth index is located between the first and second azimuth indexes;

Condition iii) the difference between the first and third distances is greater than the reference value and the difference between the second and third distances is greater than the reference value: "|R1−R3|>reference value" "|R2−R3|>reference value"; and Condition iv) the third distance is greater than the first and second distances: "R3>R1" & "R3>R2".

The above Condition i) is a condition for determining whether the first and second stationary objects correspond to objects having the same characteristic (e.g., continuous guardrails). The above Condition ii) is a condition for determining when the free space is recognized between the first and second stationary objects. The above Conditions iii) and iv) are predetermination conditions for determining whether the third stationary object exists in the area in which the third azimuth index expands radially to incorporate the third stationary object into the third azimuth index.

Figure 27:
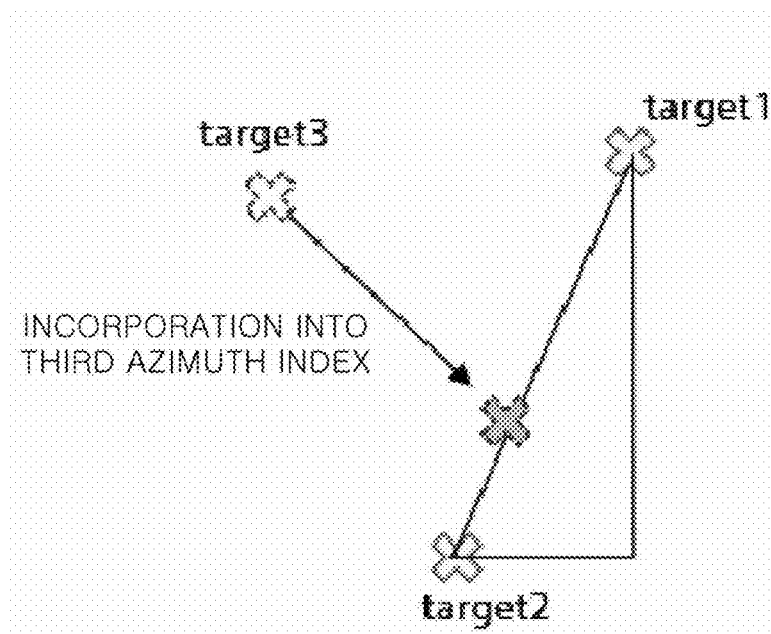

When the above correction conditions are satisfied, the control unit 200 may correct the third azimuth index by incorporating the third stationary object into the third azimuth index as illustrated in FIG. 27 using the longitudinal and transverse coordinates of the first stationary object, the longitudinal and transverse coordinates of the second stationary object, and the first and second index flags of the respective first and second azimuth indexes. Specifically, the control unit 200 may correct the third azimuth index using Equation 7 below:

$$Xpos(\text{target3}) = \Delta Xpos\_\text{unit} \times (\text{index3} - \text{index1}) + Xpos(\text{target1})$$

$$Ypos(\text{target3}) = \Delta Xpos\_\text{unit} \times (\text{index3} - \text{index1}) + Ypos(\text{target1})$$

[Equation 7]

where $$\Delta Xpos\_\text{unit} = \frac{Xpos_{(\text{target2})} - Xpos_{(\text{target1})}}{\text{index2} - \text{index1}}$$

$$\Delta Ypos\_\text{unit} = \frac{Ypos_{(\text{target2})} - Ypos_{(\text{target1})}}{\text{index2} - \text{index1}}$$

where Xpos(target3) and Ypos(target3) are longitudinal and transverse coordinates at the position where the third stationary object is incorporated into the third azimuth index, Xpos(target1) and Ypos(target1) are the longitudinal and transverse coordinates of the first stationary object, Xpos(target2) and Ypos(target2) are the longitudinal and transverse coordinates of the second stationary object, and index1 to index3 are the index flags of the respective first to third azimuth indexes.

Figure 28:
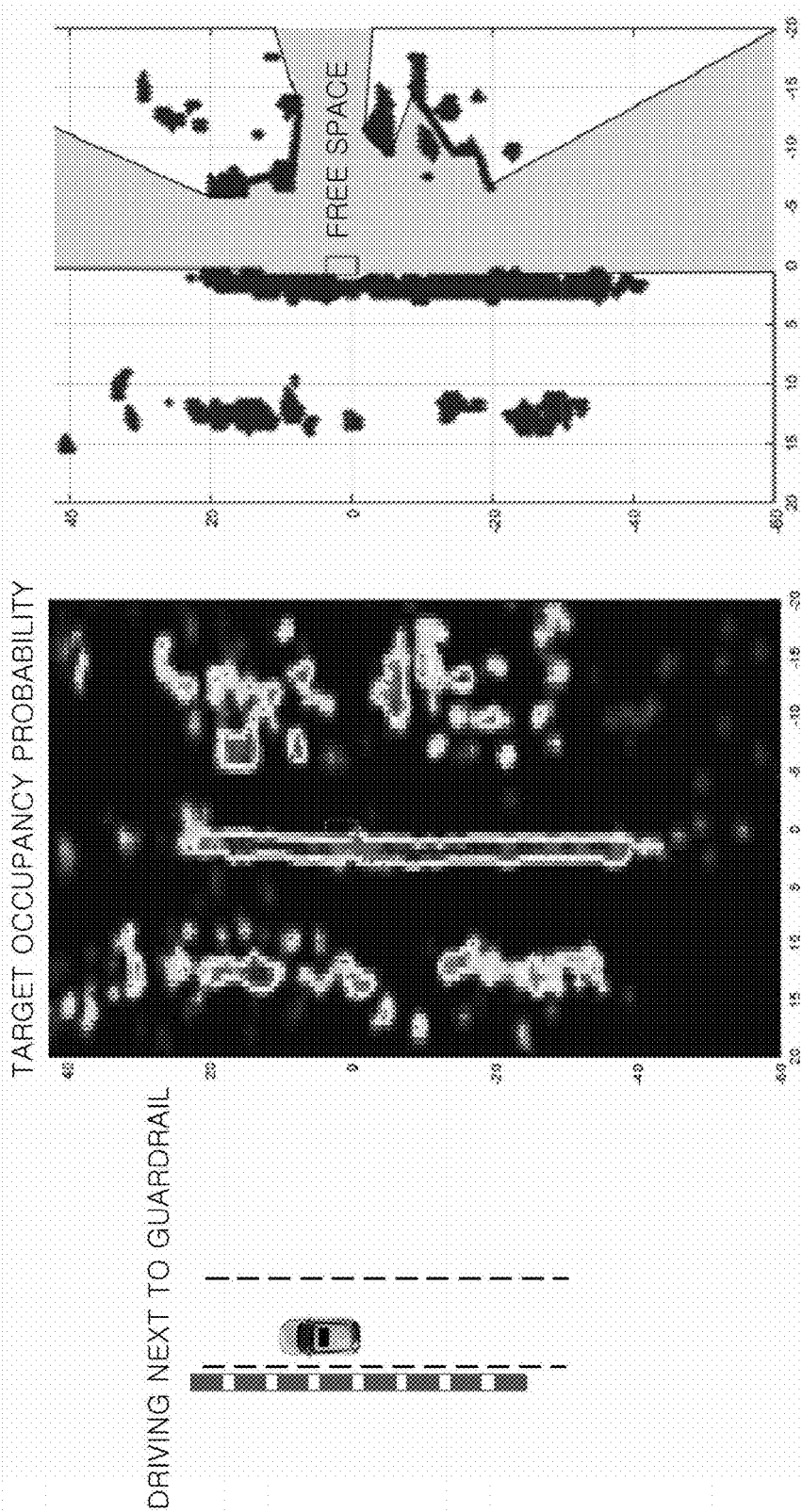

As a specific example, it is assumed that the index flags of the first to third azimuth indexes are 1, 3, and 2, respectively (index1=1, index2=3, index3=2), the longitudinal and transverse coordinates of the first stationary object are 5 and 0, respectively (Xpos(target1)=5, Ypos(target1)=0), and the longitudinal and transverse coordinates of the second stationary object are 0 and 3, respectively (Xpos(target2)=0, Ypos(target2)=3). In the above case, the calculation is ΔXpos_unit=−2.5, ΔYpos_unit=1.5, Xpos(target3)=2.5, and Ypos(target3)=1.5, so that the third stationary object is incorporated into the coordinates in the third azimuth index (2.5, 1.5). Therefore, the discontinuous free space can be removed to improve the driving safety of the vehicle. FIG. 28 illustrates a result of removal of the discontinuous free space present on the guardrail around the vehicle through the above correction processes.

9. Continuous Structure Monitoring

The plurality of peak grids determined in the process of "7. Stationary Object Location Decision (Peak Detection)" may be clustered according to whether they have the same characteristic (i.e., whether they correspond to the same physical structure). When the edge grids of the clusters formed accordingly are continuously arranged, those grids may be determined as grids on which continuous structures around the vehicle are located. The determined continuous structures may correspond to other vehicles, guardrails, or the like parked continuously in the parking lot. Accordingly, the control unit 200 may cause the vehicle to park or travel by avoiding the continuous structure therearound. This continuous structure monitoring process may be divided into a cluster creation process and an edge grid extraction process.

Figure 29:
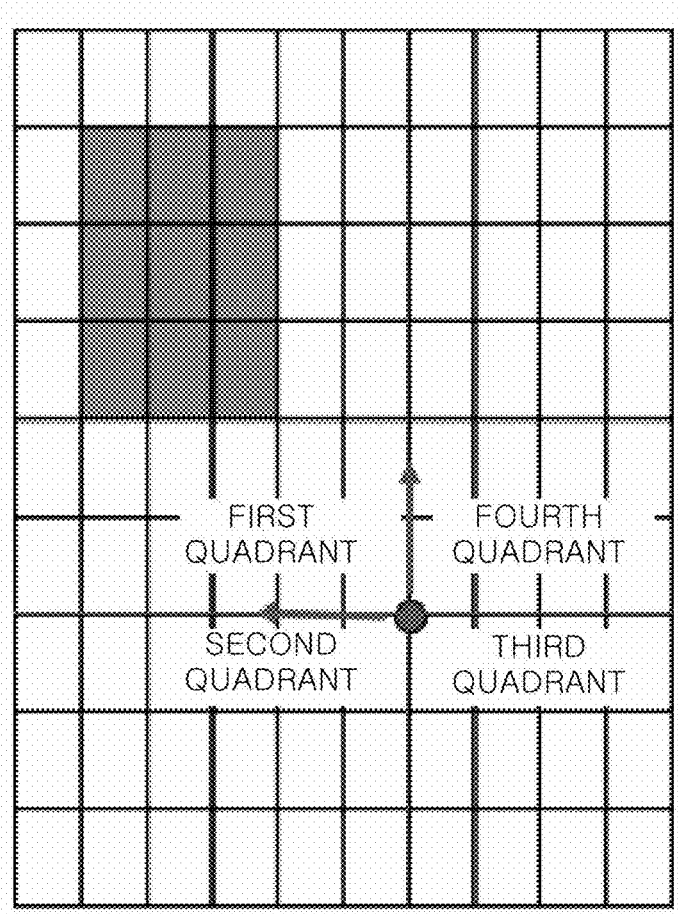
FIGS. 29 to 34 are diagrams illustrating a process of monitoring a continuous structure in the apparatus for monitoring the surrounding environment of a vehicle in accordance with the embodiment of the present disclosure.

First of all, the cluster creation process will be described. A predefined clustering algorithm may be applied to the peak grid specified in the process of "7. Stationary Object Location Decision (Peak Detection)" to create one or more clusters composed of a plurality of grids having the same characteristic. The clustering algorithm may correspond to a density based spatial clustering of applications with noise (DBSCAN) algorithm. As is well known, the DBSCAN algorithm is an algorithm that clusters a high-density part where points are concentrated, which is known as a strong model for noise and outlier identification. In the present embodiment, the distance between the peak grids where stationary objects are located is applied as the clustering criterion of the DBSCAN algorithm. That is, the cluster is composed of a set of peak grids where the distance between the peak grids is less than or equal to the reference value or they are immediately adjacent to each other. FIG. 29 illustrates an example of the created cluster.

Thereafter, the control unit 200 may operate to extract the edge grid of each cluster and to monitor continuous structures around the vehicle. Specifically, the control unit 200 may monitor the continuous structures around the vehicle by determining the edge grid of each cluster and a nearest edge grid extracted therefrom.

First, in the process of extracting the edge grid of the cluster, when a peak grid (Dmap(i,j)=1) does not exist in any of immediately adjacent grids among the grids constituting the cluster, the control unit 200 may extract that grid as the edge grid of the cluster.

Figure 30A:
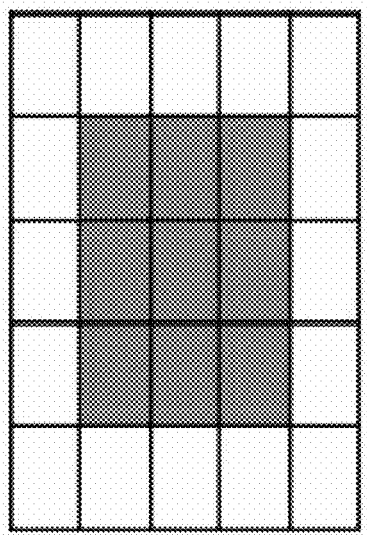
Figure 30B:
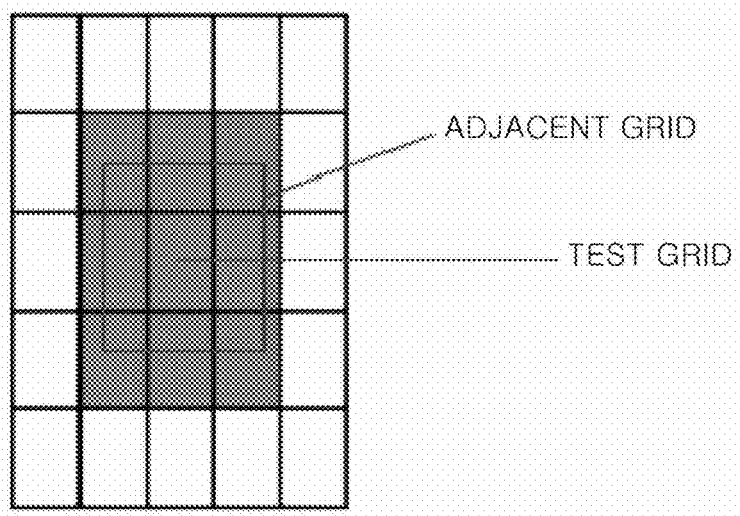
Figure 30C:
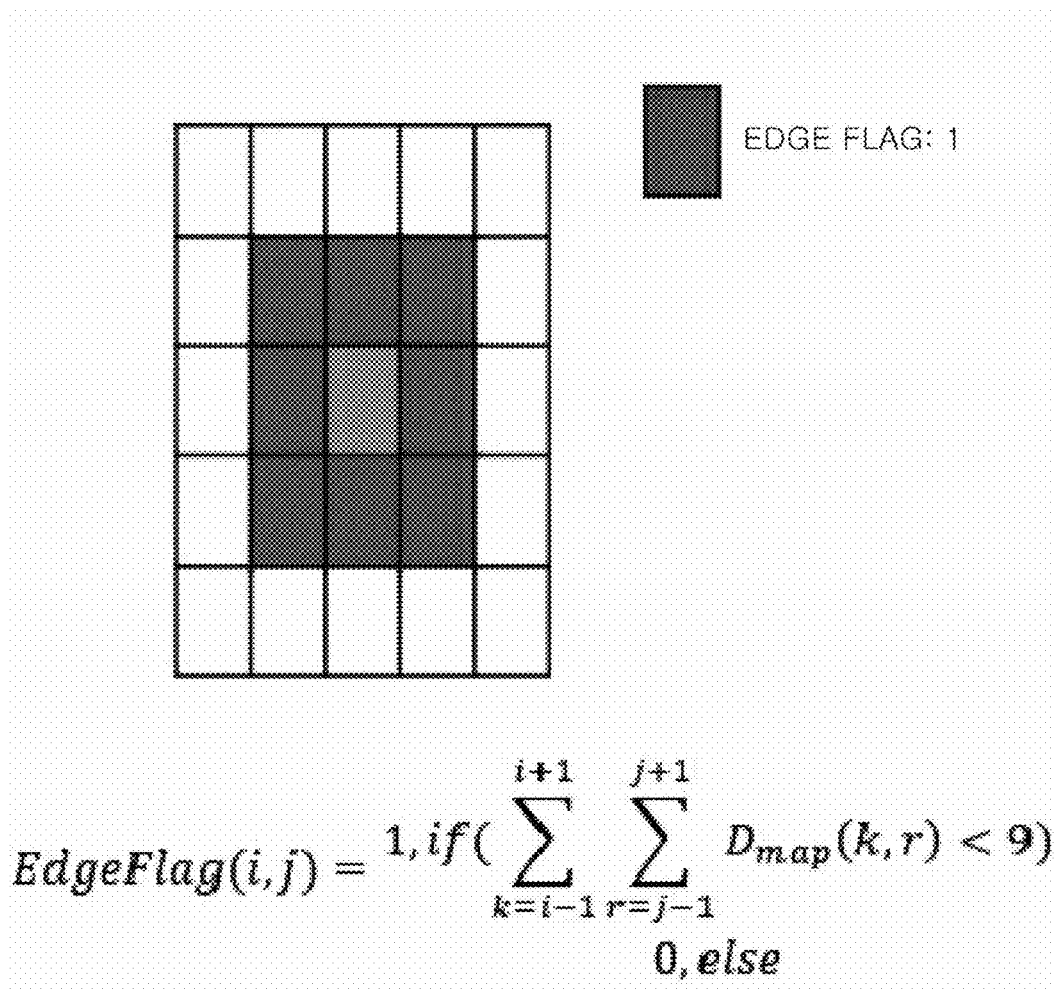

FIG. 30 illustrates an example of extracting the edge grid of the cluster. FIG. 30(*a*) illustrates grids constituting the cluster, wherein it is determined whether a peak grid present in a grid immediately adjacent to that grid using Equation 8 below.

$$EdgeFlag(i, j) = \begin{cases} 1, \text{ if } \left( \sum_{k=i-1}^{i+1} \sum_{r=j-1}^{j+1} D_{map}(k, r) < 9 \right) \\ 0, \text{ else} \end{cases} \quad [\text{Equation 8}]$$

Referring to FIG. 30(*b*), in a "test grid", since all the immediately adjacent grids correspond to peak grids, the edge flag is set to a value of 0 in Equation 8, and in an "adjacent grid", since at least one of the immediately adjacent grids does not correspond to a peak grid, the edge flag is set to a value of 1 in Equation 8. As a result, an edge grid in which the edge flag is set to a value of 1 may be extracted as illustrated in FIG. 30(*c*). The edge flag extraction process in FIG. 30 and Equation 8 is performed to secure memory resources and reduce the amount of computation and computational complexity in the process of determining a nearest edge flag to be described later.

When the edge grid of the cluster is extracted, the control unit 200 may determine a nearest edge grid, which is at a position closest to the vehicle, from among the extracted edge grids. As described above, the longitudinal axis, transverse axis, and index of the grid map are set with respect to the vehicle. Accordingly, the grid map may be divided into first to fourth quadrants with respect to the vehicle as illustrated in FIG. 29. The positions of the first to fourth quadrants are the same as the positions of the quadrants in the normal X-Y coordinate system.

In the process of determining the nearest edge grid of the cluster, the control unit 200 may operate to determine the nearest edge grid of that cluster in a variable manner depending on a quadrant in which that cluster exists among the first to fourth quadrants.

Figure 31:
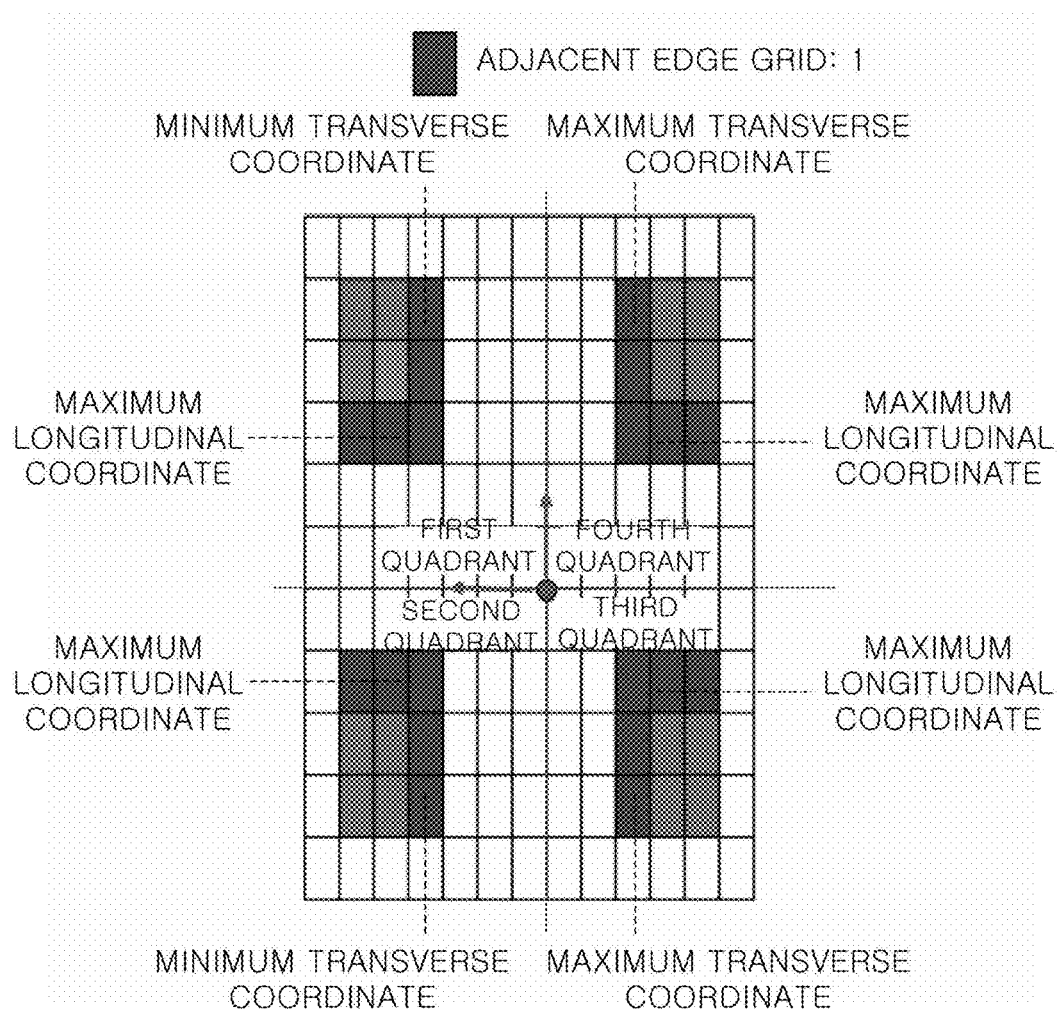

Specifically, as illustrated in FIG. 31, the control unit 200 may, i) when a cluster exists in the first quadrant, determine, as a nearest edge grid, a grid with minimum longitudinal and minimum transverse coordinates of the index among the edge grids of that cluster, ii) when a cluster exists in the second quadrant, determine, as a nearest edge grid, a grid with maximum longitudinal and minimum transverse coordinates of the index among the edge grids of that cluster, iii) when a cluster exists in the third quadrant, determine, as a nearest edge grid, a grid with maximum longitudinal and maximum transverse coordinates of the index among the edge grids of that cluster, and iv) when a cluster exists in the fourth quadrant, determine, as a nearest edge grid, a grid with minimum longitudinal and maximum transverse coordinates of the index among the edge grids of that cluster.

Figure 32:
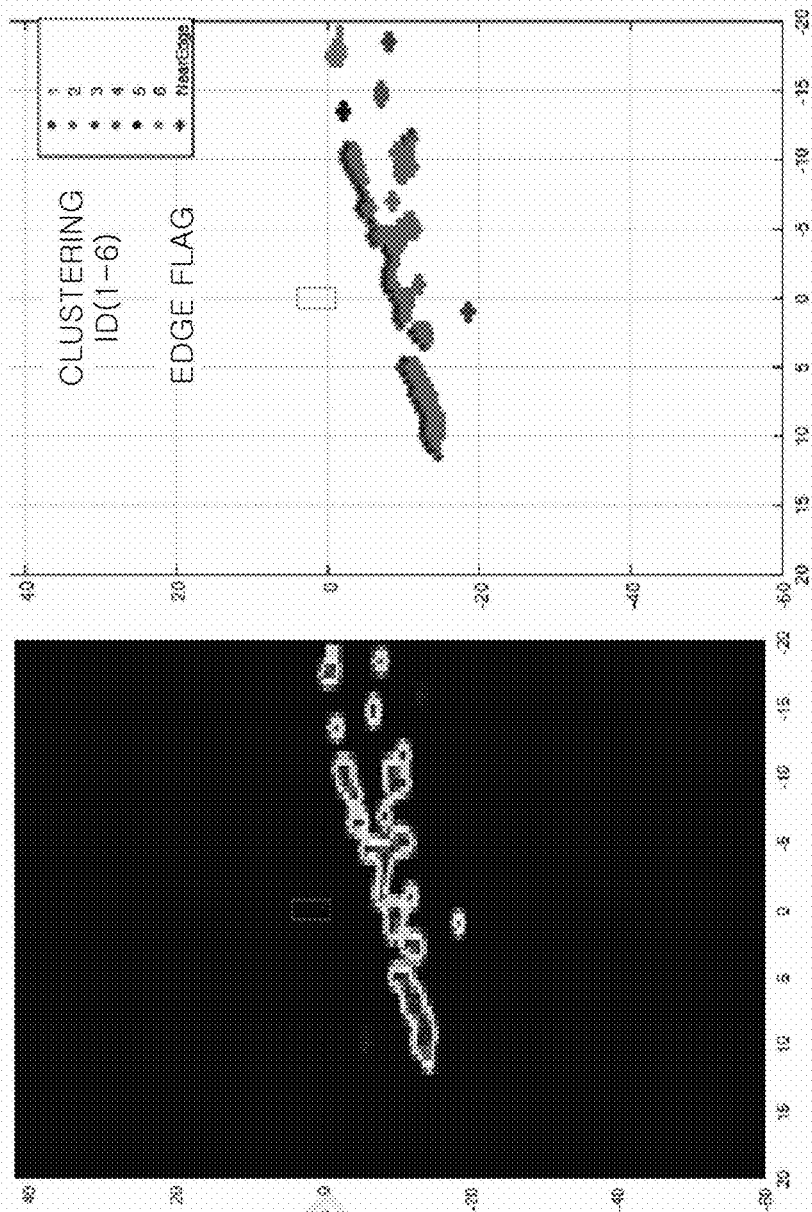

When the nearest edge grids of the cluster are determined and the determined nearest edge grids are continuously arranged, the control unit 200 may determine those nearest edge grids as grids on which continuous structures around the vehicle are located. FIG. 32 illustrates a result of cluster and nearest edge grid extraction when other vehicles parked continuously in a diagonal pattern exist around the vehicle. FIG. 33 illustrates a result of cluster and nearest edge grid extraction when other vehicles parked continuously in an orthogonal pattern exist around the vehicle. FIG. 34 illustrates a result of cluster and nearest edge grid extraction when a guardrail exists around the vehicle. Accordingly, the control unit 200 may cause the vehicle to park or travel by avoiding the continuous structure therearound.

FIG. 35 is a flowchart for explaining a method of monitoring a surrounding environment of a vehicle in accordance with an embodiment of the present disclosure. The method of monitoring a surrounding environment of a vehicle in accordance with the present embodiment will be described with reference to FIG. 35. A detailed description of any part that overlaps with the foregoing will be omitted and the following description will be focused on the time-series configuration thereof.

First, the control unit 200 extracts a stationary object among objects outside the vehicle, detected by the sensor unit 100, by using the behavior information of the vehicle, in step S100.

Then, the control unit 200 maps the stationary object extracted in step S100 to a preset grid map, adds occupancy information to each of grids constituting the grid map according to whether the stationary object is mapped to the grid map, and calculates an occupancy probability parameter from the occupancy information added to the grids within the grid map in a plurality of frames to be monitored, the occupancy probability parameter indicating the probability that the stationary object will be located at the corresponding grid, in step S200.

In step S200, the control unit 200 maps the stationary object to the grid map while updating the grid map by changing the respective indexes of the grids constituting the grid map according to the behavior information of the vehicle.

Furthermore, in step S200, the control unit 200 converts the location information of the stationary object into an index corresponding to the grid map, maps the stationary object to the grid map by specifying a target grid of the grid map, corresponding to the index, adds occupancy information with a first value to the target grid to which the stationary object is mapped, and adds occupancy information with a second value to the other grids, the second value being smaller than the first value.

Furthermore, in step S200, the control unit 200 calculates an occupancy probability parameter by deciding an expanded mapping area expanded by a preset range on the basis of the target grid to which the stationary object is mapped, and adding the occupancy information with the first value to each of grids constituting the expanded mapping area.

Furthermore, in step S200, the control unit 200 corrects the occupancy probability parameters of grids constituting a second expanded mapping area by comparing a first expanded mapping area in the $(K-1)^h$ frame to the second expanded mapping area in the $K^{th}$ frame, when the grid map is updated as the $(K-1)^{th}$ frame is switched to the Kh frame. Specifically, the control unit 200 specifies a first area composed of grids whose occupancy probability parameters have increased, among the grids of the second expanded mapping area, and a second area composed of grids whose occupancy probability parameters have decreased, among the grids of the first expanded mapping area, on the basis of the $K^{th}$ frame over the $(K-1)^{th}$ frame. Then, the control unit 200 corrects the respective occupancy probability parameters of the grids constituting the second expanded mapping area in the $K^{th}$ frame by substituting the occupancy probability parameters of the second area with the occupancy probability parameters of the first area.

Furthermore, in step S200, the control unit 200 corrects a shaded grid corresponding to a shaded area where the sensor unit 100 cannot detect an outside object in the $K^{th}$ frame, by using a first method of receiving an occupancy probability parameter in the $(K-1)^{th}$ frame or a second method of receiving an occupancy probability parameter of a grid around the shaded grid. In this case, the control unit 200 corrects the shaded grid according to the first method when the speed of the vehicle is equal to or higher than a preset reference value or the threshold, and corrects the shaded grid according to the second method when the speed of the vehicle is lower than the reference value.

After step S200, the control unit 200 monitors the surrounding environment of the vehicle on the basis of the occupancy probability parameter calculated in step S200, in step S300. Specifically, the control unit 200 decides a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 determines that the stationary object is located at the peak grid. In step S300, a plurality of peak grids may be determined according to the driving of the vehicle. In step S300, the control unit 200 may recognize a free space around the vehicle using the peak grids.

Next, the control unit 200 applies a predefined clustering algorithm to the grid specified in step S300 to create one or more clusters composed of a plurality of grids having the same characteristic (S400). In step S400, the control unit 200 uses a density based spatial clustering of applications with noise (DBSCAN) algorithm as the clustering algorithm to create one or more clusters. The clustering criterion of the DBSCAN algorithm corresponds to the distance between the peak grids where stationary objects are located.

Next, the control unit 200 extracts the edge grid of each cluster created in step S400 to monitor the continuous structures around the vehicle (S500). In step S500, the control unit 200 extracts grids in which a peak grid does not exist in an immediately adjacent grid, as edge grids of the cluster, from among the grids constituting the cluster, determines nearest edge grids, which are at positions close to the vehicle, among the extracted edge grids, and when the determined nearest edge grids are continuously arranged, determines those nearest edge grids as grids on which continuous structures around the vehicle are located.

As such, the apparatus and method for monitoring the surrounding environment of a vehicle in accordance with the present embodiment may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

The apparatus and method for monitoring the surrounding environment of a vehicle may improve detection accuracy for an outside object when monitoring the surrounding environment of the vehicle through a radar.

The apparatus and method for monitoring the surrounding environment of a vehicle may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

The controller 200, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. In an example, the processor also includes a communication device, such as a computer, cellular phone, PDA (Personal Digital Assistant) and another device, which facilitates information communication between end users.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method described herein. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for monitoring a surrounding environment of a vehicle, comprising:
a sensor unit comprising a plurality of detection sensors for detecting objects outside a vehicle according to a frame at a time period; and
a controller configured to;
extract a stationary object from among the objects detected by the sensor unit based on behavior information of the vehicle,
map the stationary object to a grid map,
add occupancy information to each of grids constituting the grid map, in response to the mapping being performed,
calculate an occupancy probability parameter, indicative of a probability that the stationary object is located on each grid, from the occupancy information added to the grid in the grid map in a plurality of frames to be monitored,
monitor the surrounding environment of the vehicle based on the occupancy probability parameter, and
correct a shaded grid, corresponding to a shaded area where the sensor unit is not able to detect an object outside the vehicle, in a differential manner according to the speed of the vehicle,
wherein the controller is further configured to:
correct the shaded grid corresponding to the shaded area where the sensor unit is not able to detect the object outside the vehicle in a $K^{th}$ frame, in a first scheme to receive an occupancy probability parameter of a grid around the shaded grid, in response to the speed of the vehicle being less than a threshold, and
correct the shaded grid from an outermost shaded grid in the first scheme, and
set a highest occupancy probability parameter, from among occupancy probability parameters of grids located within a set range from the shaded grid, as an occupancy probability parameter of the shaded grid from the outermost shaded grid in the first scheme.

2. The apparatus according to claim 1, wherein the controller is further configured to correct the shaded grid, corresponding to the shaded area where the sensor unit is not able to detect the object outside the vehicle in a $K^{th}$ frame, in a first second scheme to receive an occupancy probability parameter in a $(K-1)^{th}$ frame, in response to the speed of the vehicle being equal to or higher than the threshold.

3. An apparatus for monitoring a surrounding environment of a vehicle, comprising:
a sensor unit comprising a plurality of detection sensors for detecting objects outside a vehicle according to a frame at a time period; and
a controller configured to;
extract a stationary object from among the objects detected by the sensor unit,
map the extracted stationary object to a grid map,
calculate an occupancy probability parameter, indicative of a probability that the stationary object is located on a grid of the grid map, from a result of mapping, and
monitor the surrounding environment of the vehicle by specifying a grid on which the stationary object is located in the grid map, based on the calculated occupancy probability parameter and recognizing a free space around the vehicle using the specified grid,
wherein the controller is further configured to:
determine a peak grid with a maximum occupancy probability parameter among the grids in the grid map, and
determine that the stationary object is located on the peak grid, in response to the occupancy probability parameter of the peak grid being equal to or greater than a threshold value defined for the peak grid, and the peak grid on which the stationary object is determined to be located comprises a plurality of peak grids in relation to the driving of the vehicle,
wherein the controller is further configured to:
map a stationary object corresponding to the peak grid to an azimuth map, the azimuth map having a plurality of azimuth indexes partitioned at equal radial intervals by a set radius and a set angle and sharing coordinates with the grid map, and
recognize an azimuth index, to which no stationary object is mapped, as the free space around the vehicle,
wherein the controller is further configured to correct a third azimuth index to which a stationary object is not mapped to an azimuth index to which a stationary object is mapped when a correction condition is satisfied, in response to the third azimuth index existing adjacent to first and second azimuth indexes to which first and second stationary objects are mapped, respectively, and a third stationary object existing in an area in which the third azimuth index expands radially,
wherein the azimuth indexes on the azimuth map have index flags having sequential values set according to the sequential positions of the respective azimuth indexes,
wherein the controller is further configured to correct the third azimuth index by incorporating the third stationary object into the third azimuth index using longitudinal and transverse coordinates of the first stationary object, longitudinal and transverse coordinates of the second stationary object, and first and second index flags of the respective first and second azimuth indexes, and
wherein the controller is further configured to correct the third azimuth index using Equation below:

$$Xpos(\text{target3}) = \Delta Xpos\_\text{unit} \times (\text{index3} - \text{index1}) + Xpos(\text{target1})$$

$$Ypos(\text{target3}) = \Delta Xpos\_\text{unit} \times (\text{index3} - \text{index1}) + Ypos(\text{target1})$$

where $$\Delta Xpos\_\text{unit} = \frac{Xpos_{(target2)} - Xpos_{(target1)}}{\text{index2} - \text{index1}}$$

$$\Delta Ypos\_\text{unit} = \frac{Ypos_{(target2)} - Ypos_{(target1)}}{\text{index2} - \text{index1}}$$

wherein Xpos(target3) and Ypos(target3) are longitudinal and transverse coordinates at a position where the third stationary object is incorporated into the third azimuth index, Xpos(target1) and Ypos(target1) are the longitudinal and transverse coordinates of the first stationary object, Xpos(target2) and Ypos(target2) are the longitudinal and transverse coordinates of the second stationary object, and index1 to index3 are the index flags of the respective first to third azimuth indexes.

4. The apparatus according to claim 3, wherein, in response to the distances from the vehicle to the first to third stationary objects being defined as first to third distances, respectively, the correction condition comprise any one or any combination of i) a condition in which the difference between the first and second distances is less than a reference value, ii) a condition in which the third azimuth index is located between the first and second azimuth indexes, iii) a condition in which the difference between the first and third distances is greater than a reference value and the difference between the second and third distances is greater than a reference value, and iv) a condition in which the third distance is greater than the first and second distances.

5. An apparatus for monitoring a surrounding environment of a vehicle, comprising:
a sensor unit comprising a plurality of detection sensors for detecting objects outside a vehicle according to a frame at a time period; and
a controller configured to;
extract a stationary object from among the objects detected by the sensor unit,
map the extracted stationary object to a grid map, calculate an occupancy probability parameter, indicative of a probability that the stationary object is located on a grid of the grid map, from a result of mapping, monitor the surrounding environment of the vehicle by specifying a grid on which the stationary object is located in the grid map, based on the calculated occupancy probability parameter, apply a clustering algorithm to the specified grid to create one or more clusters composed of a plurality of grids having a same characteristic, and to extract an edge grid of each of the created one or more clusters to monitor a continuous structure around the vehicle.

6. The apparatus according to claim 5, wherein the controller is further configured to:

determine a peak grid with a maximum occupancy probability parameter among the plurality of grids in the grid map, and to determine that the stationary object is located on the peak grid, in response to the occupancy probability parameter of the peak grid being equal to or greater than a threshold value defined for the peak grid, and the peak grid on which the stationary object is determined to be located comprises a plurality of peak grids in relation to the driving of the vehicle.

7. The apparatus according to claim 6, wherein the controller is further configured to use a density based spatial clustering of applications with noise (DBSCAN) algorithm as the clustering algorithm to create one or more clusters.

8. The apparatus according to claim 7, wherein the clustering criterion of the DBSCAN algorithm corresponds to a distance between the peak grids where the stationary object is determined to be located.

9. The apparatus according to claim 5, wherein the controller is further configured to extract grids in which a peak grid does not exist in an immediately adjacent grid, as edge grid of the cluster, from among the grids constituting the cluster.

10. The apparatus according to claim 9, wherein the controller is further configured to determine nearest edge grids, which are at positions closest to the vehicle, among the extracted edge grids, and to determine the nearest edge grids as grids on which continuous structures around the vehicle are located, in response to the determined nearest edge grids being continuously arranged.

11. The apparatus according to claim 10, wherein the grid map has a longitudinal axis, a transverse axis, and an index set with respect to the vehicle; and wherein when the nearest edge grids of the cluster are determined, the controller is further configured to determine the nearest edge grids of the cluster in a variable manner depending on a quadrant in which that cluster exists from among first to fourth quadrants partitioned in the grid map with respect to the vehicle.

12. The apparatus according to claim 11, wherein the controller is further configured to:

determine, as a nearest edge grid, a grid with minimum longitudinal and minimum transverse coordinates of an index among the edge grids of the cluster, in response to the cluster existing in the first quadrant;

determine, as a nearest edge grid, a grid with maximum longitudinal and minimum transverse coordinates of an index among the edge grids of the cluster, in response to the cluster existing in the second quadrant;

determine, as a nearest edge grid, a grid with maximum longitudinal and maximum transverse coordinates of an index among the edge grids of the cluster, in response to the cluster existing in the third quadrant; and determine, as a nearest edge grid, a grid with minimum longitudinal and maximum transverse coordinates of an index among the edge grids of the cluster, in response to the cluster existing in the fourth quadrant.

* * * * *